United States Patent
Claflin et al.

(10) Patent No.: US 10,315,767 B2
(45) Date of Patent: *Jun. 11, 2019

(54) VACUUM POWERED ACTUATION MECHANISM FOR A VERTICALLY STOWABLE AIRCRAFT STORAGE UNIT

(71) Applicant: B/E Aerospace, Inc., Wellington, FL (US)

(72) Inventors: Shawn A. Claflin, Seattle, WA (US); James B. Hauser, Clinton, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 413 days.

This patent is subject to a terminal disclaimer.

(21) Appl. No.: 15/289,152

(22) Filed: Oct. 8, 2016

(65) Prior Publication Data

US 2017/0023027 A1 Jan. 26, 2017

Related U.S. Application Data

(63) Continuation-in-part of application No. 15/284,268, filed on Oct. 3, 2016, which is a continuation of
(Continued)

(51) Int. Cl.
 *B64D 11/00* (2006.01)
 *B64D 11/04* (2006.01)

(52) U.S. Cl.
 CPC ............ *B64D 11/003* (2013.01); *B64D 11/04* (2013.01)

(58) Field of Classification Search
 CPC ................... B64D 11/003; F15B 15/10; F15B 2211/8757; F16J 3/06
(Continued)

(56) References Cited

U.S. PATENT DOCUMENTS

| 3,319,532 A | 5/1967 | Pridham, Jr. |
| 4,597,320 A | 7/1986 | Kamio |

(Continued)

FOREIGN PATENT DOCUMENTS

| CN | 101054966 A | 10/2007 |
| DE | 198 00 588 A1 | 7/1999 |

(Continued)

OTHER PUBLICATIONS

Second Office Action issued in related application CN 201580024652.1, with English language translation, dated May 10, 2018, 8 pages.
(Continued)

*Primary Examiner* — Christopher P Ellis
(74) *Attorney, Agent, or Firm* — Clements Bernard Walker PLLC

(57) ABSTRACT

In a preferred embodiment, a vertically stowable aircraft storage unit for providing additional storage in a cabin area of an aircraft can include a storage compartment and a vacuum lift mechanism for lifting and lowering the storage compartment between a stowed position and a deployed position. The vacuum lift mechanism can include at least one vacuum actuator in fluid communication with a vacuum source. The aircraft storage unit can further include an overhead mounting frame for mounting the vacuum lift mechanism to an upper structure of an interior of the aircraft, and a storage compartment frame configured to releasably receive the storage compartment. The vacuum lift mechanism may be releasably attached, at an upper end, to the overhead mounting frame, and at a lower end, to the storage compartment frame. The upper structure of the interior of the aircraft can be above a ceiling of the cabin area.

20 Claims, 24 Drawing Sheets

Related U.S. Application Data application No. PCT/US2015/023707, filed on Mar. 31, 2015.

(60) Provisional application No. 61/974,095, filed on Apr. 2, 2014.

(58) Field of Classification Search
USPC .................................................. 244/118.5
See application file for complete search history.

(56) References Cited

U.S. PATENT DOCUMENTS

| | | | |
|---|---|---|---|
| 5,441,218 | A | 8/1995 | Mueller et al. |
| 6,088,239 | A * | 7/2000 | Zeiss .................... B64D 11/003 244/118.1 |
| 8,567,719 | B2 | 10/2013 | Schalla et al. |
| 10,000,287 | B2 * | 6/2018 | Claflin ................ B64D 11/003 |
| 2002/0145080 | A1 * | 10/2002 | Renken ................ B64D 11/02 244/118.5 |
| 2002/0153453 | A1 * | 10/2002 | Kamstra ............. B64D 11/003 244/118.5 |
| 2005/0230195 | A1 * | 10/2005 | Jones ................. E05B 47/0009 188/68 |
| 2007/0240564 | A1 | 10/2007 | Uehara et al. |
| 2008/0078873 | A1 | 4/2008 | Schalla et al. |
| 2009/0010772 | A1 * | 1/2009 | Siemroth .................. F16J 3/06 417/400 |
| 2013/0186999 | A1 * | 7/2013 | Huber ..................... B64D 9/00 244/118.1 |
| 2013/0328361 | A1 * | 12/2013 | Egan ...................... B64D 11/06 297/188.01 |
| 2014/0377017 | A1 * | 12/2014 | Panzram ................ B65G 51/03 406/88 |
| 2015/0285278 | A1 * | 10/2015 | Claflin ................... B64D 11/00 248/318 |
| 2017/0023027 | A1 * | 1/2017 | Claflin ................... B64D 11/04 |
| 2019/0031351 | A1 * | 1/2019 | Roth .................... B64D 11/003 |
| 2019/0032685 | A1 * | 1/2019 | Foster ..................... F16K 5/184 |

FOREIGN PATENT DOCUMENTS

| | | | |
|---|---|---|---|
| EP | 1 249 392 A1 | 10/2002 | |
| EP | 3305661 A1 * | 4/2018 | ............ B64D 11/04 |
| FR | 2 950 605 A1 | 4/2011 | |
| WO | 2015/153682 A1 | 10/2015 | |
| WO | 2017/003814 A1 | 1/2017 | |

OTHER PUBLICATIONS

European Search Report issued in related application EP 17194794.8, dated Jan. 8, 2018, 9 pages.
Office Action issued in related application CN 201580024652.1, with English language translation, dated Sep. 15, 2017, 16 pages.
International Search Report dated Jun. 22, 2015 for PCT/US2015/023707 filed Mar. 31, 2015.
International Written Opinion dated Jun. 22, 2015 for PCT/US2015/023707 filed Mar. 31, 2015.

* cited by examiner

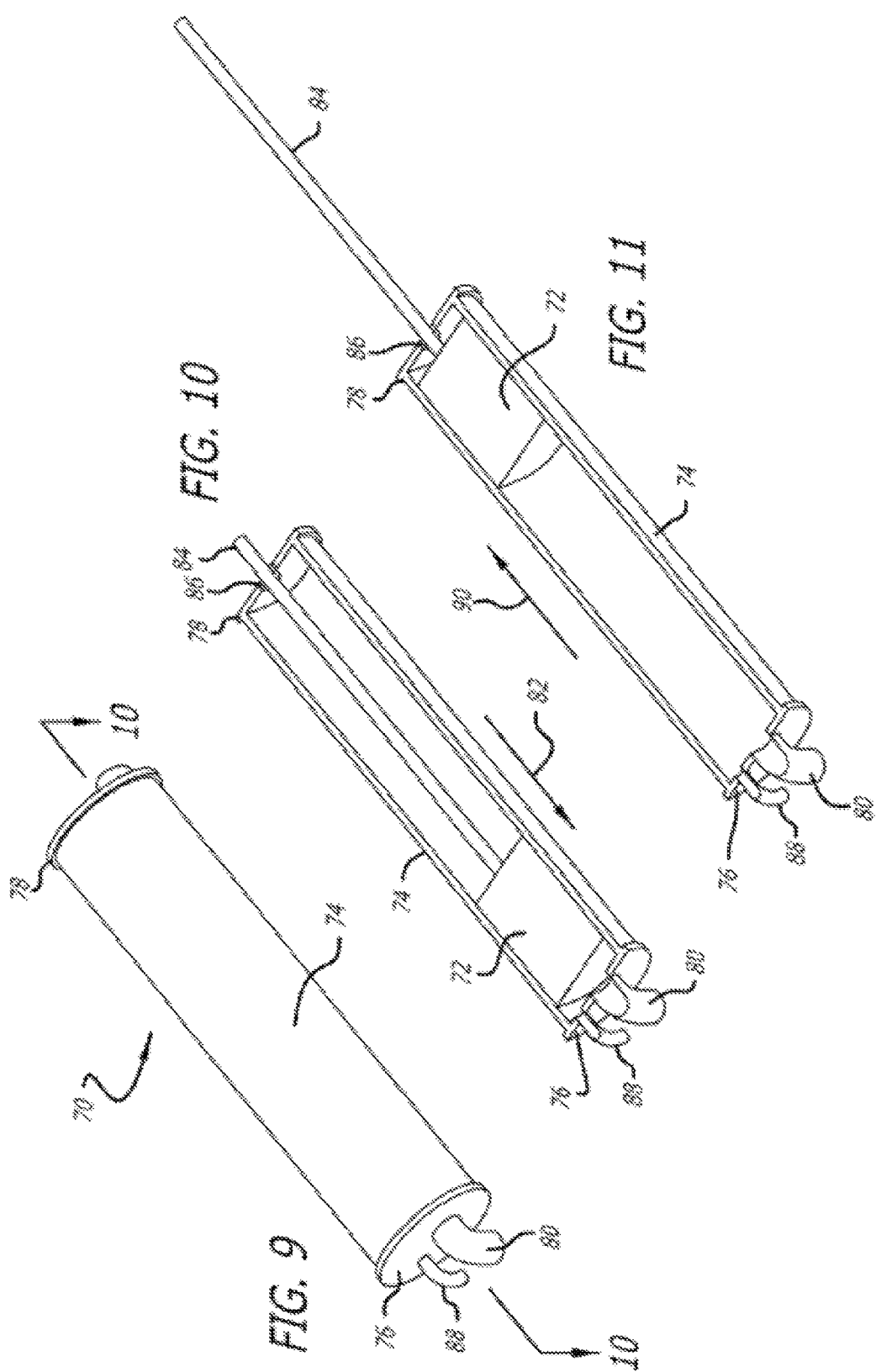

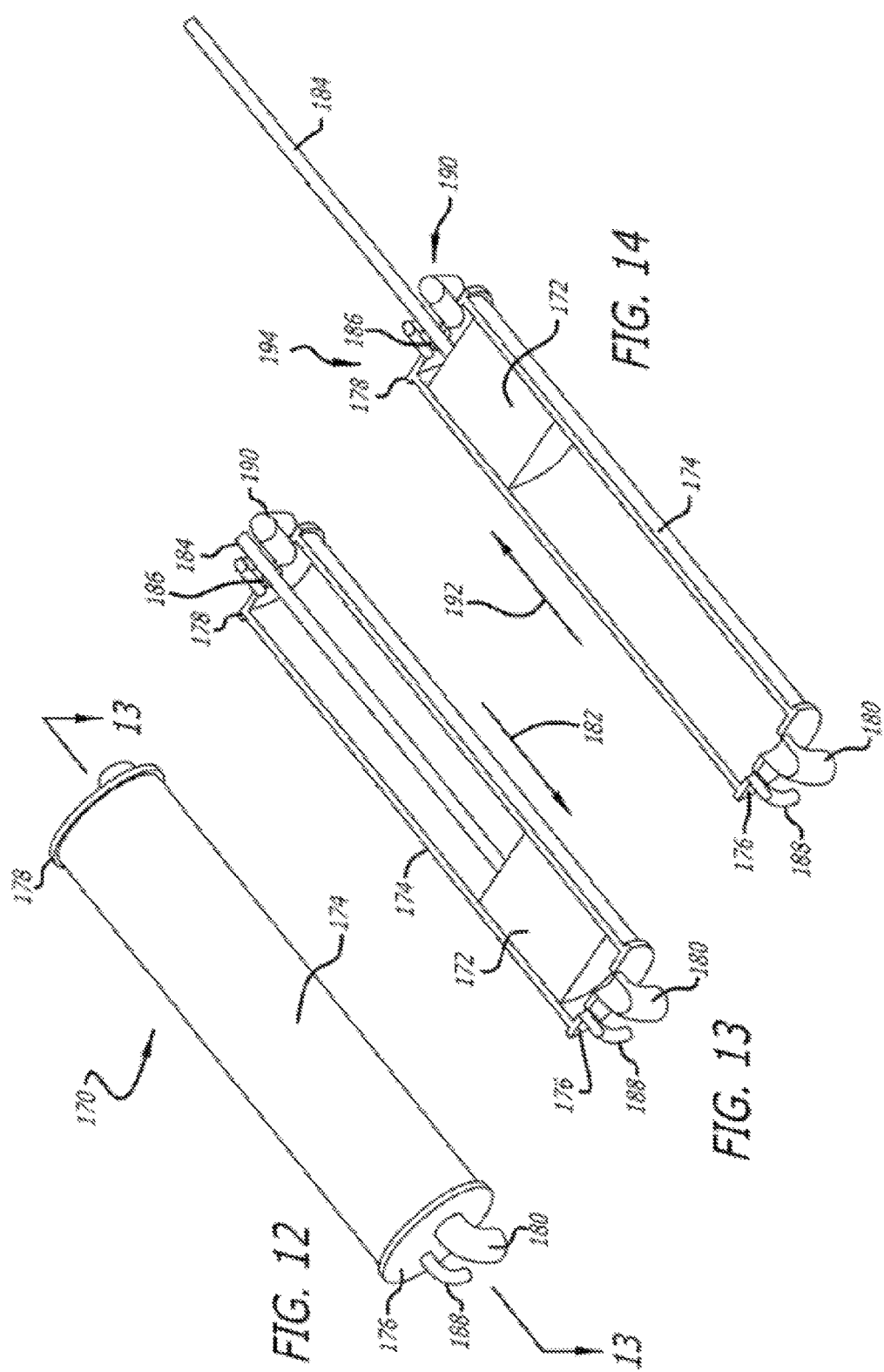

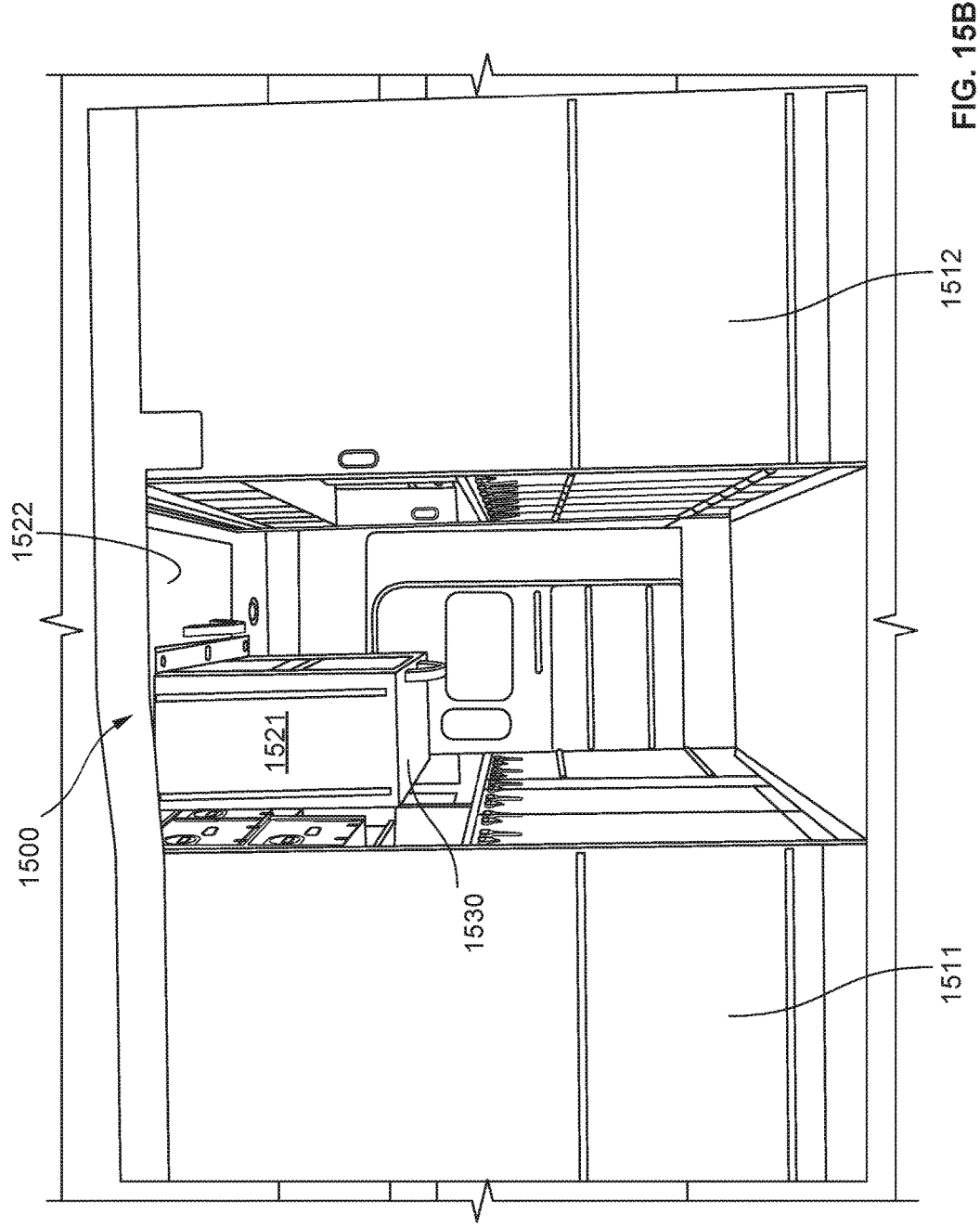

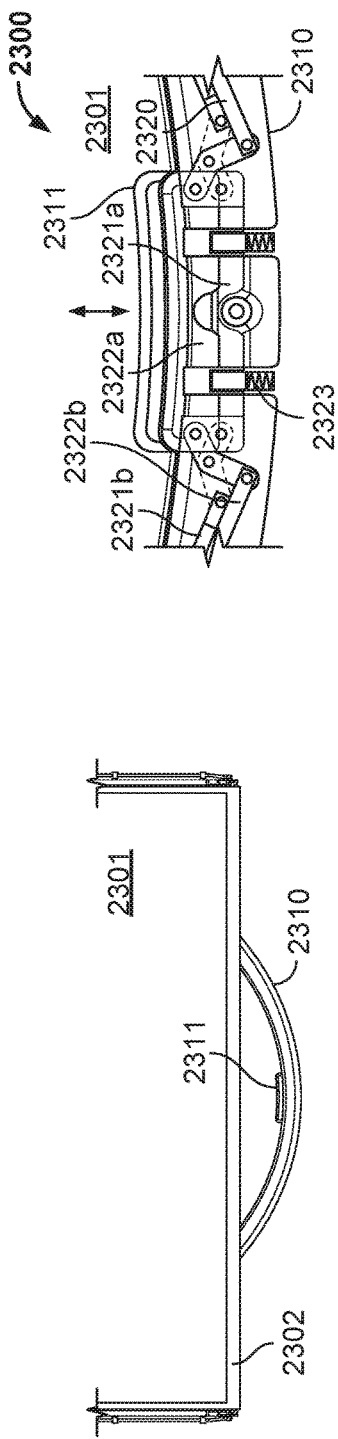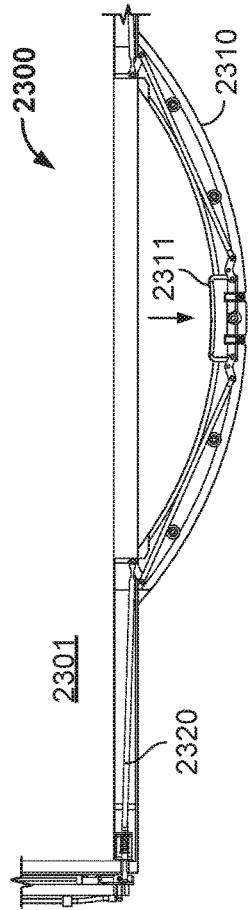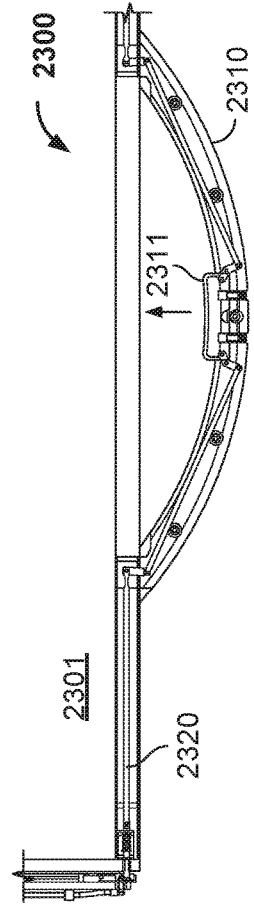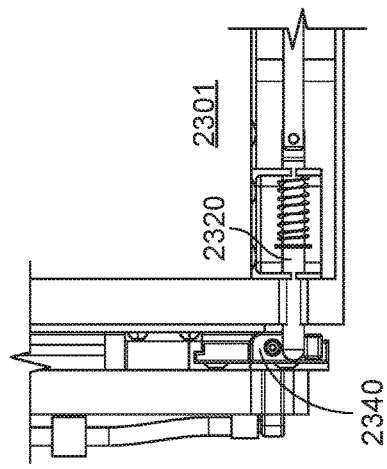

VACUUM POWERED ACTUATION MECHANISM FOR A VERTICALLY STOWABLE AIRCRAFT STORAGE UNIT

CROSS REFERENCES TO RELATED APPLICATIONS

This application is a continuation-in-part of and claims priority from U.S. application Ser. No. 15/284,268, entitled "Vacuum Powered Lifting Mechanism" and filed Oct. 3, 2016, which is a continuation of International Patent Application No. PCT/US2015/023707 filed Mar. 31, 2015, which claims priority from U.S. Provisional Application No. 61/876,095, filed Apr. 2, 2014. This application is also related to U.S. application Ser. No. 14/672,570, entitled "Vacuum Powered Lifting Mechanism" and filed Mar. 30, 2015 (now U.S. Pat. No. 9,435,360) which claims priority from U.S. Provisional Application No. 61/876,095. The contents of each of the above-noted applications are hereby incorporated by reference in their entirety.

BACKGROUND

The present disclosure relates generally to power-assisted mechanisms, and more particularly to vacuum powered moving systems for moving a movable component such as an aircraft stowage bin or container.

Pivoting aircraft overhead stowage bins or containers typically rely on force provided by an operator, such as a passenger or flight attendant, for example, to close and secure the stowage container, and typically have no operator assist. Springs or other simple mechanisms designed to assist in moving stowage containers or devices generally force users to pull downward on the container or device for loading when it is empty or only lightly loaded, and to push upward on the container or device when it is fully loaded.

Power-assisted stowage bin systems have been used as an attempt to solve this problem. For example, a powered stowage bin system is known that includes a powered stowage bin lift system, which unlatches the stowage bin and provides a powered lifting force controlled by a cabin management system. Furthermore, powered systems have been used as an alternative to manual force in other aircraft-related applications such as opening and closing lavatory doors and crew rests and compacting trash.

However, typically such systems use an electric motor, which can be disadvantageous. For example, in the case of electrical failure or reduced electrical power, a passenger or flight attendant may be trapped in a lavatory or injured by a lowered stowage bin, causing safety concerns. Furthermore, constant use of electricity to provide power to every motorized feature in an aircraft, from lowering stowage bins and opening lavatory doors to deploying video monitors and compacting trash, added on top of cabin pressure monitoring and other control systems, can be expensive for an aircraft to maintain. Therefore, it is desirable to provide a power-assisted mechanism that is safe to provide and inexpensive to maintain, having a minimum draw of electrical power. It is further desirable to provide a power-assisted mechanism to provide power for opening and closing stowage containers and aircraft galley and closet overhead bins, to provide power when there is risk that a human could be trapped or injured, to provide power for articulation of aircraft seats, leg rests and the like, to provide power assistance in deploying an expandable compartment such as a crew rest or lavatory, to provide power assistance in retrieving galley carts or standard units from a rear of a galley, to provide power to compact trash, to provide power to deploy overhead video monitors, to provide power assistance to open and close doors and other panels, such as deployable credenzas and the like, to provide variable comfort control to mattresses and other cushions within an aircraft cabin, to provide power assistance for variable geometry seating to assist in reconfiguring a cabin, and the like.

Hence, it would be desirable to provide a vacuum powered lift assist mechanism that can be used with aircraft overhead stowage bins or other types of stowage containers or devices, and can be retrofitted in combination with existing aircraft overhead stowage bins. It would also be desirable to provide a vacuum powered overhead closet system utilizing vacuum actuation for a lifting mechanism, requiring a minimum draw of electrical power. The present disclosure meets these and other needs.

SUMMARY OF ILLUSTRATIVE EMBODIMENTS

Aspects of the disclosure provide a vertically stowable aircraft storage unit for providing additional storage in a cabin area of an aircraft. The aircraft storage unit can include a storage compartment including a bottom panel, two side panels, and a rear panel, and a vacuum lift mechanism for lifting and lowering the storage compartment between a stowed position and a deployed position. The vacuum lift mechanism can include at least one vacuum actuator, and an air manifold in fluid communication with a vacuum source. The air manifold is configured to provide vacuum and venting to the at least one vacuum actuator. The aircraft storage unit can further include an overhead mounting frame for mounting the vacuum lift mechanism to an upper structure of an interior of the aircraft, and a storage compartment frame configured to releasably receive the storage compartment. The vacuum lift mechanism is releasably attached, at an upper end, to the overhead mounting frame, and at a lower end, to the storage compartment frame. The upper structure of the interior of the aircraft can be above a ceiling of the cabin area.

In one example, the vertically stowable aircraft storage unit is configured as part of an aircraft galley monument, and is configured to receive and retain a plurality of aircraft galley standard unit containers. In one example, the vacuum source is configured to provide vacuum for both the vertically stowable aircraft storage unit and a waste water unit of a galley monument.

In one example, the vertically stowable aircraft storage unit further includes a manual override mechanism for lifting and lowering the storage unit in the event of failure of the vacuum lift mechanism. The manual override mechanism can include a rotary-to-linear drive mechanism, a manual control mechanism for operating the rotary-to-linear drive mechanism, and a manual override mounting frame for releasably mounting the manual override mechanism between the overhead mounting frame and the storage compartment frame. The rotary-to-linear drive mechanism can include a lead screw. The manual control mechanism can include a hand crank. The manual control mechanism can be pivotably mounted to a lower horizontal structural member of the manual override mounting frame.

In one example, the vertically stowable aircraft storage unit further includes a rotary-to-linear damping mechanism for controlling speed of lifting and lowering of the storage unit.

In one example, the vertically stowable aircraft storage unit includes a latching mechanism for releasably latching the storage compartment frame and storage compartment in the stowed position. The latching mechanism can include a set of at least four electronic latches. Each electronic latch of the at least four electronic latches is positioned proximate a respective corner of the overhead mounting frame.

In one example, the latching mechanism can include at least two spring-enabled bolt assemblies. In one example, the vertically stowable aircraft storage unit further includes a manual release mechanism for disengaging the latching mechanism. The manual release mechanism is built into a handle mounted on the bottom panel of the storage compartment.

In one example, the vertically stowable aircraft storage unit further includes an impact avoidance mechanism. The impact avoidance mechanism can include at least one sensor, and a trigger mechanism configured to, upon identifying an obstruction, trigger the vacuum lift mechanism to reverse course from lowering to lifting to avoid impact with the identified obstruction. In one example, the vertically stowable aircraft storage unit further includes a control panel unit for controlling the vacuum lift mechanism via at least one user-actuated control.

In one example, the vertically stowable aircraft storage unit further includes a second storage compartment frame configured to releasably receive a second storage compartment. In one example, the storage compartment comprises a garment rack.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIG. 9 is a perspective view of an example vacuum powered lifting system according to an embodiment having a single acting linear vacuum actuator for the vacuum powered lifting system of FIG. 8.

FIG. 10 is a cross-sectional view of the vacuum powered lifting system of FIG. 9 taken along line 10-10, showing a piston that actuates a stowage container (not shown) in a first direction, such as for raising or stowing a stowage container, when vacuum is provided to the single acting linear vacuum actuator.

FIG. 11 is a cross-sectional view similar to FIG. 10, showing the piston released in a second direction, such as for lowering or deploying a stowage container, when venting the single acting linear vacuum actuator.

FIG. 12 is a perspective view of an example vacuum powered lifting system according to an embodiment having a dual acting linear vacuum actuator for the vacuum powered lifting system of FIG. 8.

FIG. 13 is a cross-sectional view of the vacuum powered lifting system of FIG. 12 taken along line 13-13, showing a piston that actuates a stowage container (not shown) in a first direction, such as for raising or stowing a stowage container, when vacuum is provided to the dual acting linear vacuum actuator and when venting the dual acting linear vacuum actuator.

FIG. 14 is a cross-sectional view similar to FIG. 13, where the piston actuates the stowage container (not shown) in a second direction, such as for lowering or deploying a stowage container, when vacuum is provided to the dual acting linear vacuum actuator and when venting the dual acting linear vacuum actuator.

FIGS. 15A through 15C show an example vertically movable storage unit installed above a ceiling over a cross aisle between two galley monuments in an aircraft galley complex.

FIGS. 23A through 23E illustrate a manual release mechanism according to an example.

DETAILED DESCRIPTION OF ILLUSTRATIVE EMBODIMENTS

Figure 1:
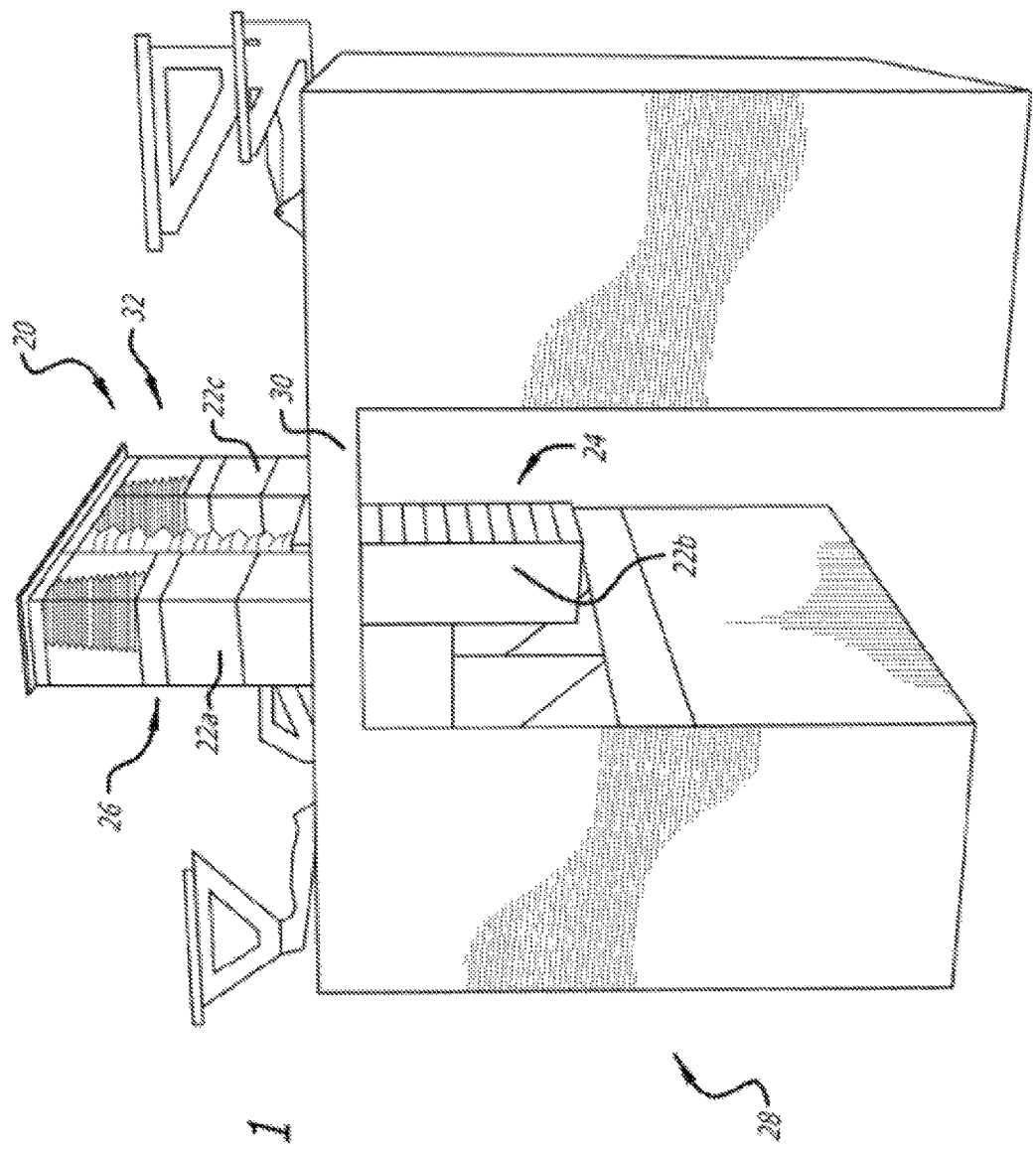
FIG. 1 is a front perspective view of above ceiling closet boxes housing stowage containers in a full service aircraft galley, illustrating an example vacuum powered lifting system according to the disclosure, where two of the stowage containers are in a raised or stowed position inside the above ceiling closet boxes and one of the stowage containers is in a lowered or deployed position, with side panels of the above ceiling closet boxes removed for clarity.

Referring to the drawings, which are provided by way of illustration and example, and not by way of limitation, the present disclosure provides for a vacuum powered system 20 for moving or lifting one or more movable components, for example stowage containers 22*a*, 22*b*, and 22*c*, between a first position and a second position. As shown in FIGS. 1-7, the vacuum powered system provides a lifting force for moving stowage containers in an aircraft between a lowered or deployed position 24 for accessing the stowage container for loading and unloading items, and a raised or stowed position 26 for storing the stowage container.

Figure 2:
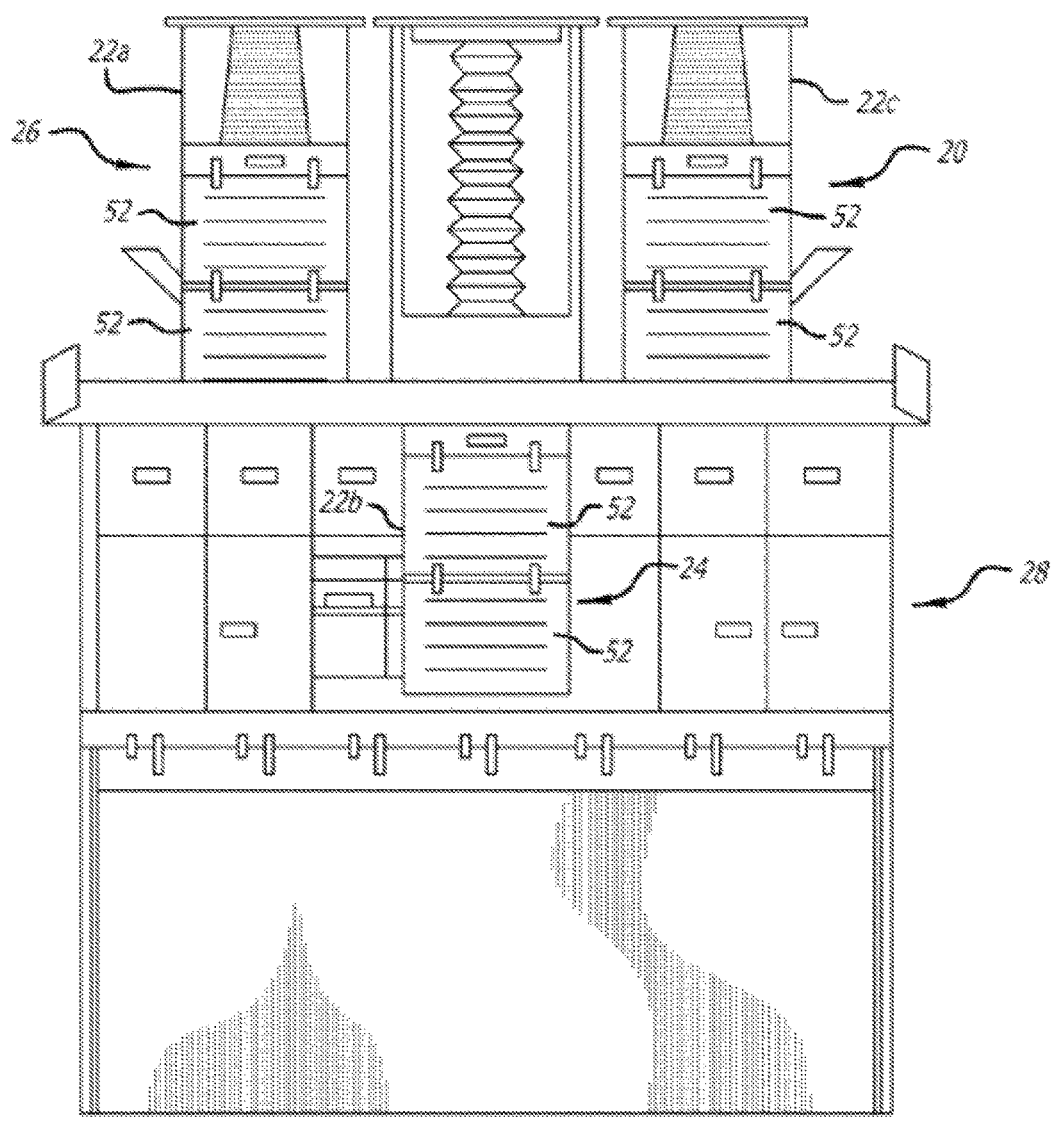
FIG. 2 is a front view of the above ceiling closet boxes and stowage containers, illustrating the example vacuum powered lifting system of FIG. 1, with side panels of portions of the above ceiling closet boxes removed for clarity.

Referring to FIGS. 1 and 2, according to a presently preferred aspect, the vacuum powered system is implemented in a full service aircraft galley 28, which typically includes a beverage center, one or more oven and/or chiller units, one or more galley cart bays, and the like. Aircraft galley typically includes a ceiling panel 30, with storage space 32 above the ceiling panel for an overhead stowage of a plurality of stowage containers. In an exemplary aspect, the storage space 32 includes three abreast stowage containers, including a center unit 22b shown in a lowered or deployed position for loading or unloading items from the stowage container, and two side units 22a and 22c shown in a raised or stowed position for storing the stowage containers. In another exemplary aspect, each stowage container removably receives and stores one or more standard storage units 52 in which items are loaded or unloaded.

Figure 3:
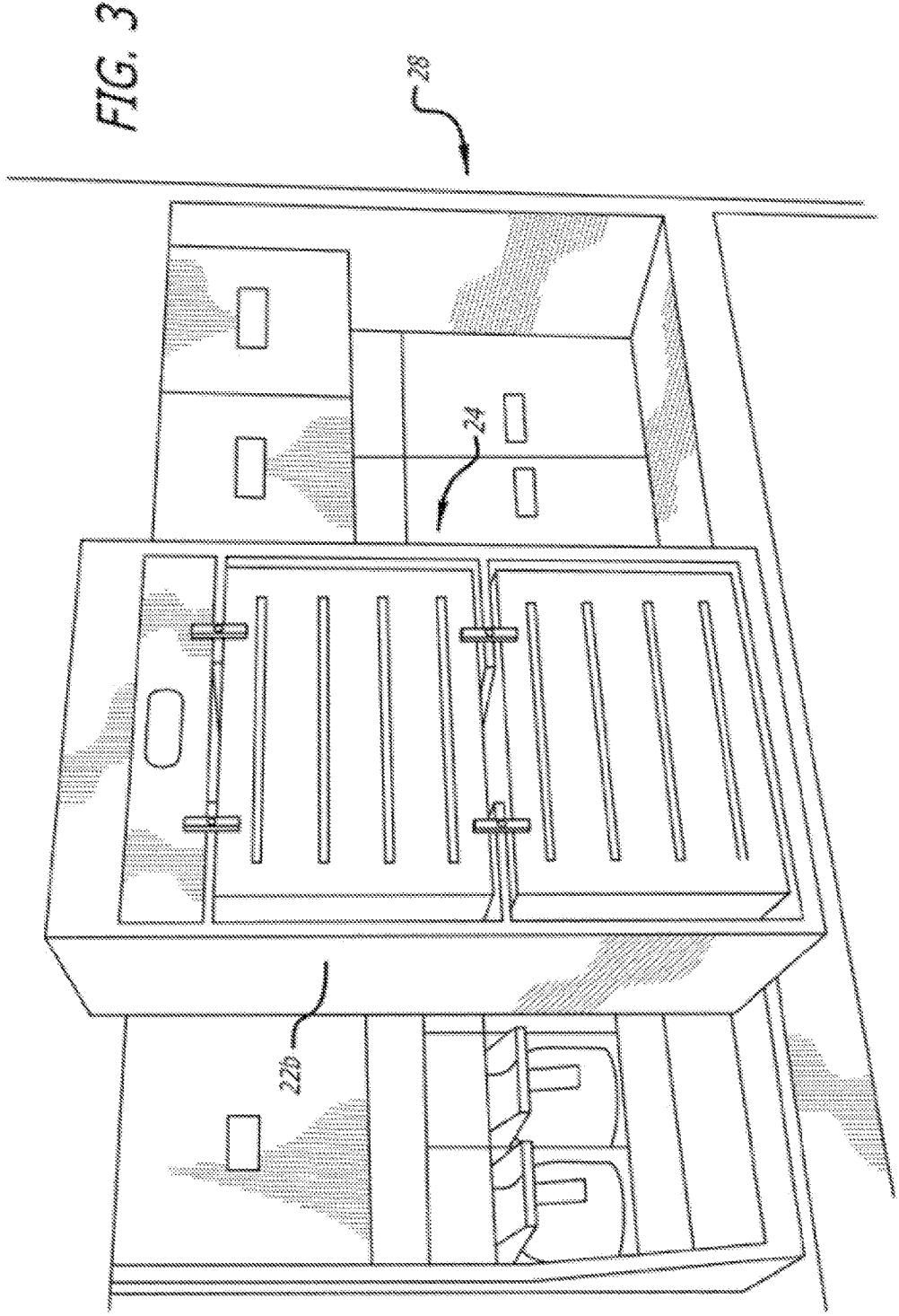
FIG. 3 is a front perspective view of the lowered stowage container of FIG. 1.
Figure 4:
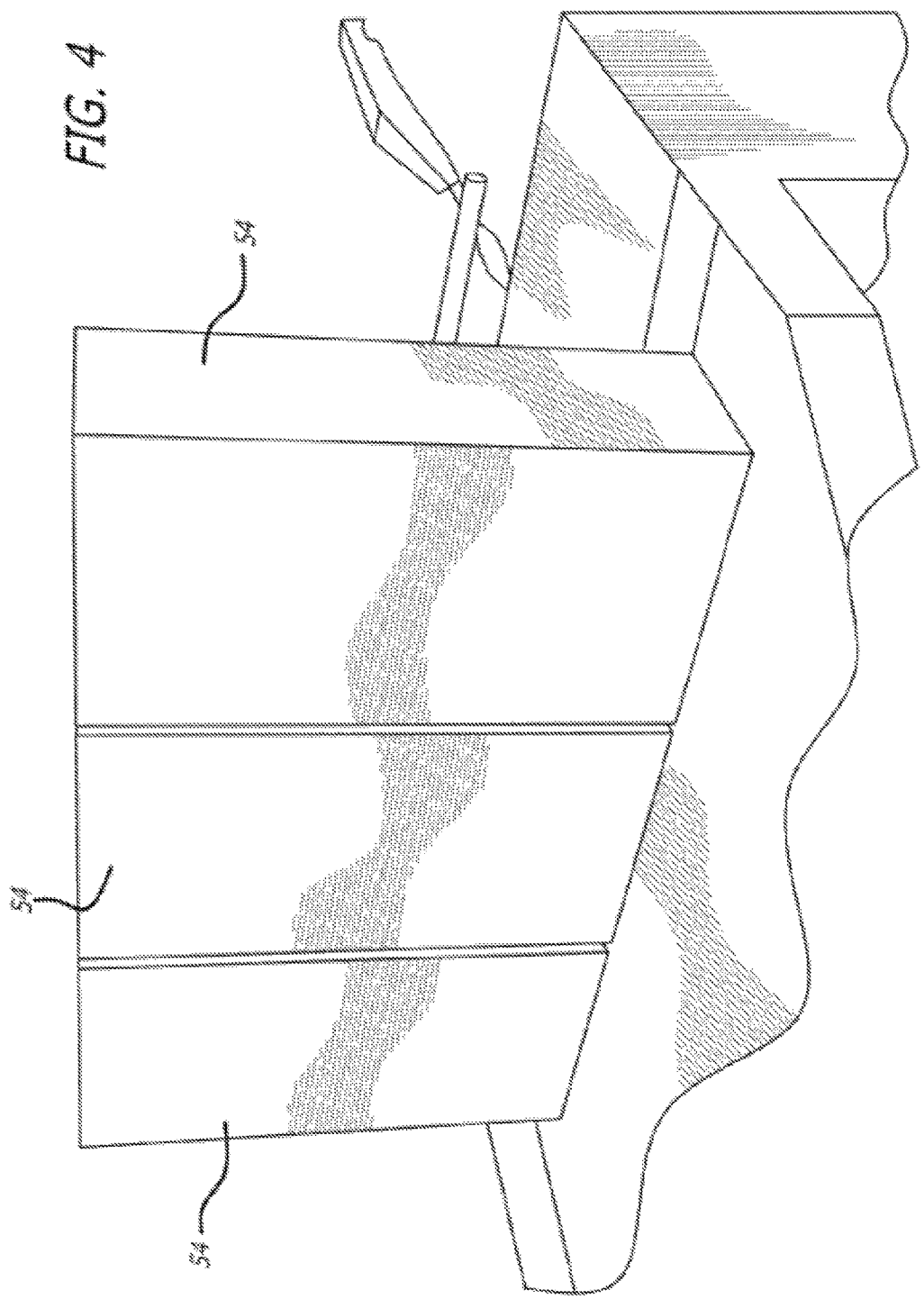
FIG. 4 is a front perspective view of the above ceiling closet boxes of FIG. 1.

FIG. 3 illustrates the lowered stowage container 22b in the aircraft galley. In an exemplary aspect, a flight attendant in the aircraft galley uses the vacuum powered system to lower a stowage container having one or more standard storage units into a deployed position. The flight attendant then proceeds to load or unload items into the standard storage units. When the flight attendant is finished loading or unloading items into the stowage container, the flight attendant uses the vacuum powered system to lift the stowage container back into a stowed position above the ceiling panel.

Figure 5:
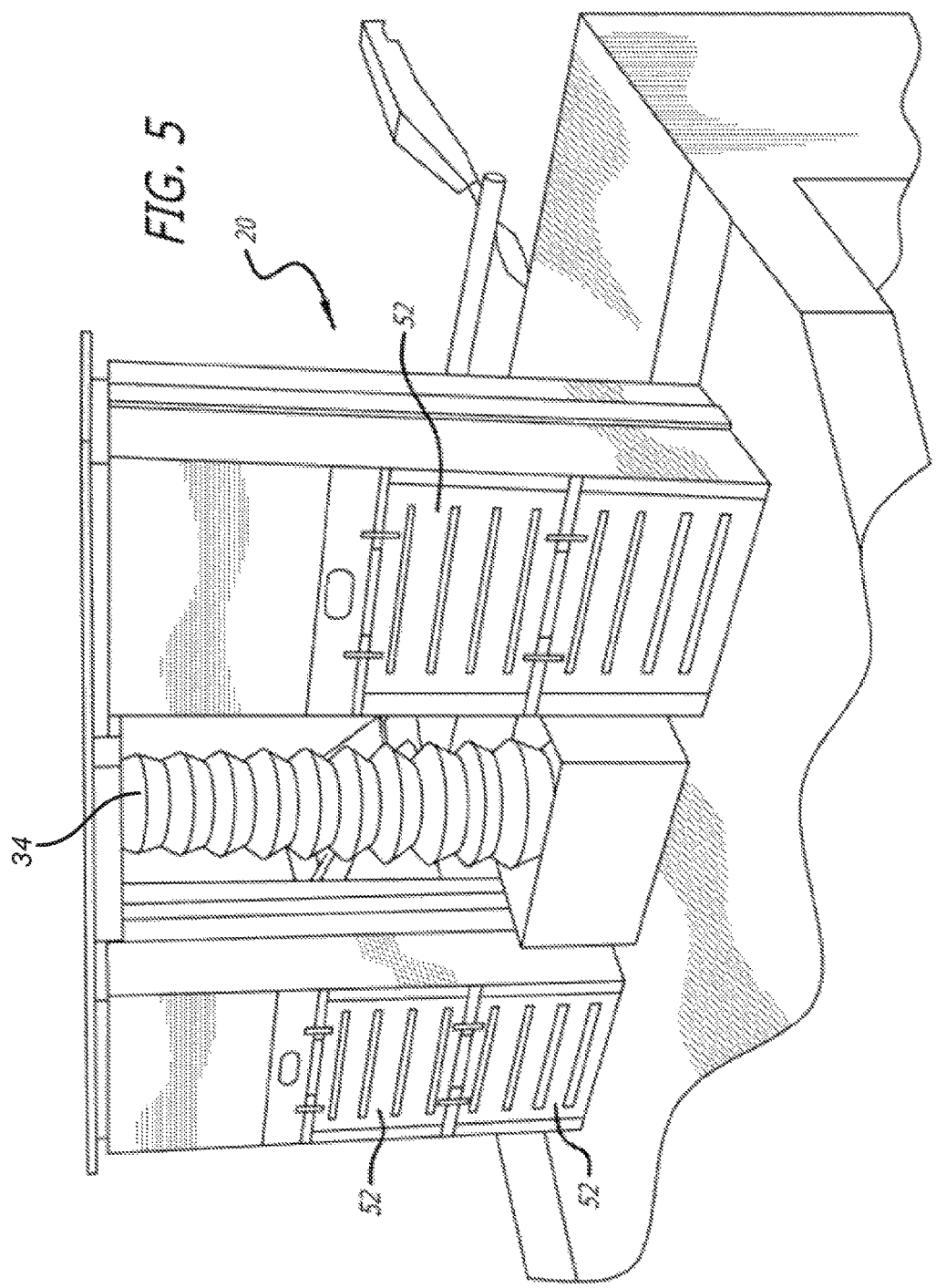
FIG. 5 is a front perspective view of the above ceiling closet boxes and stowage containers of FIG. 1, with side panels of the above ceiling closet boxes removed for clarity.
Figure 6:
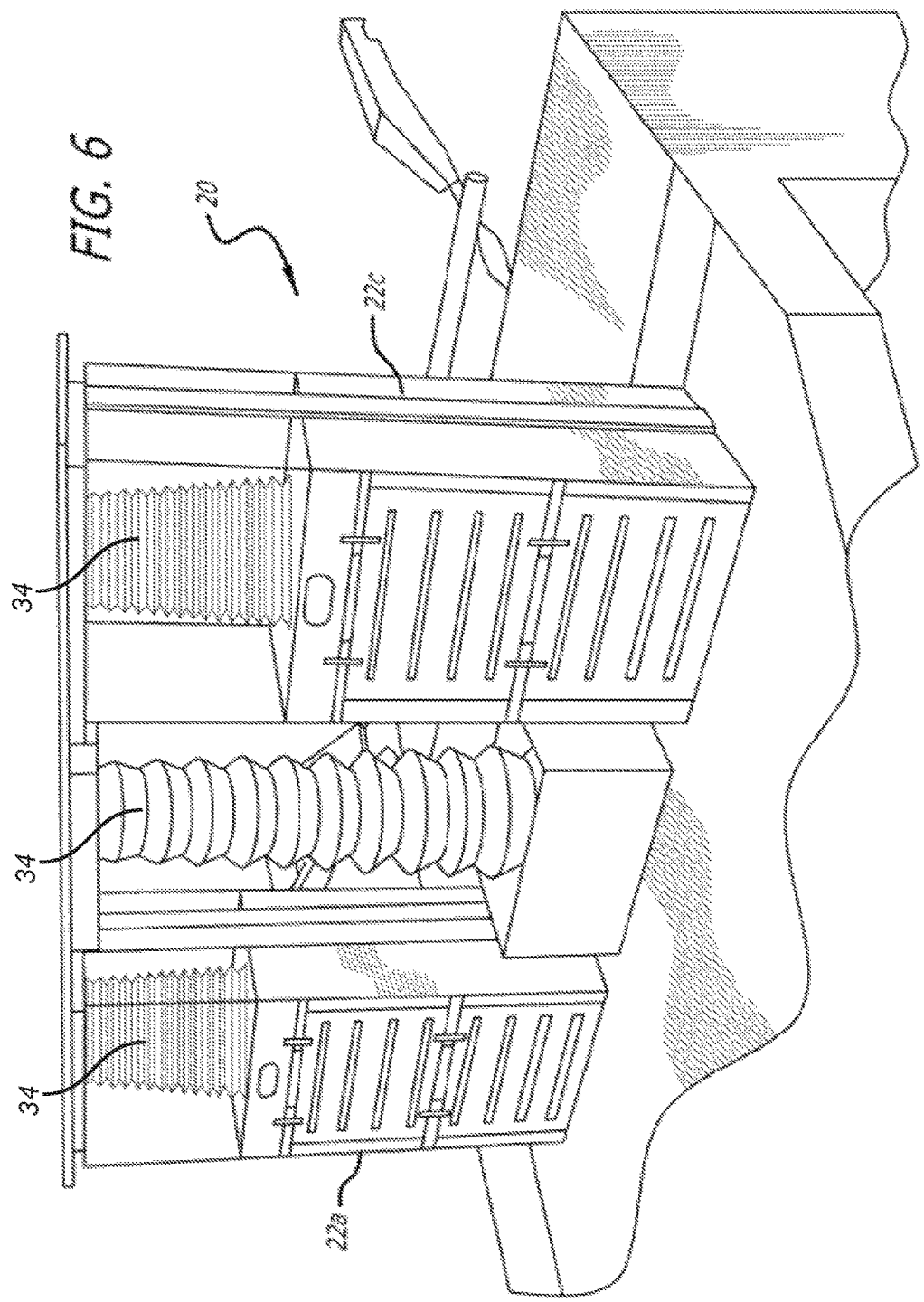
FIG. 6 is a front perspective view of the above ceiling closet boxes and stowage containers of FIG. 1, with side panels of upper portions of the above ceiling closet boxes removed for clarity.

FIGS. 4-7 show that the movable components or stowage containers are contained in, and move relative to, a fixed structure 54. As can be seen in FIGS. 5 and 6, according to one aspect, the fixed structure is a stationary stowage container housing or above ceiling closet box 54 which houses the stowage container. Each movable component is connected to a vacuum actuator 34, which in turn, is mounted to the fixed structure as shown in FIG. 6. With respect to FIG. 7, each stowage container housing includes one or more intake ports 48 configured to connect in fluid communication with a source of vacuum for raising the stowage container, and one or more bleed valve ports 50 configured to vent the vacuum actuator for lowering the stowage container.

Conversely, in other implementations, the vacuum lift mechanism is designed to push the storage compartment (stowage container) downwards, for example to overcome a spring force designed to maintain the storage compartment within its stowed position. In this circumstance, to raise the storage compartment, the vacuum actuator may be vented to raise, while a manual push is provided to raise the storage compartment with aid of the spring force.

Figure 7:
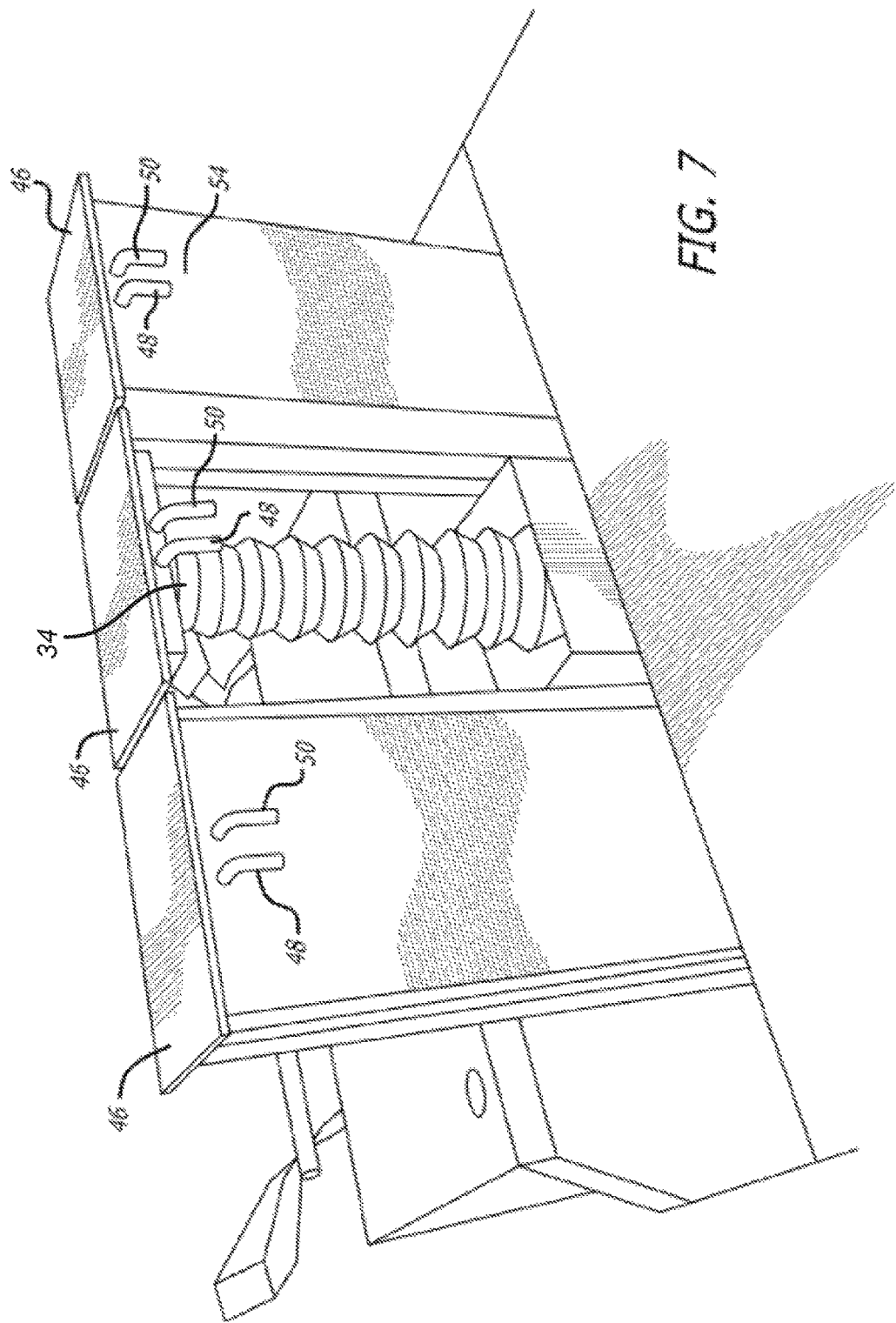
FIG. 7 is a rear perspective view of the above ceiling closet boxes and stowage containers of FIG. 1.
Figure 8:
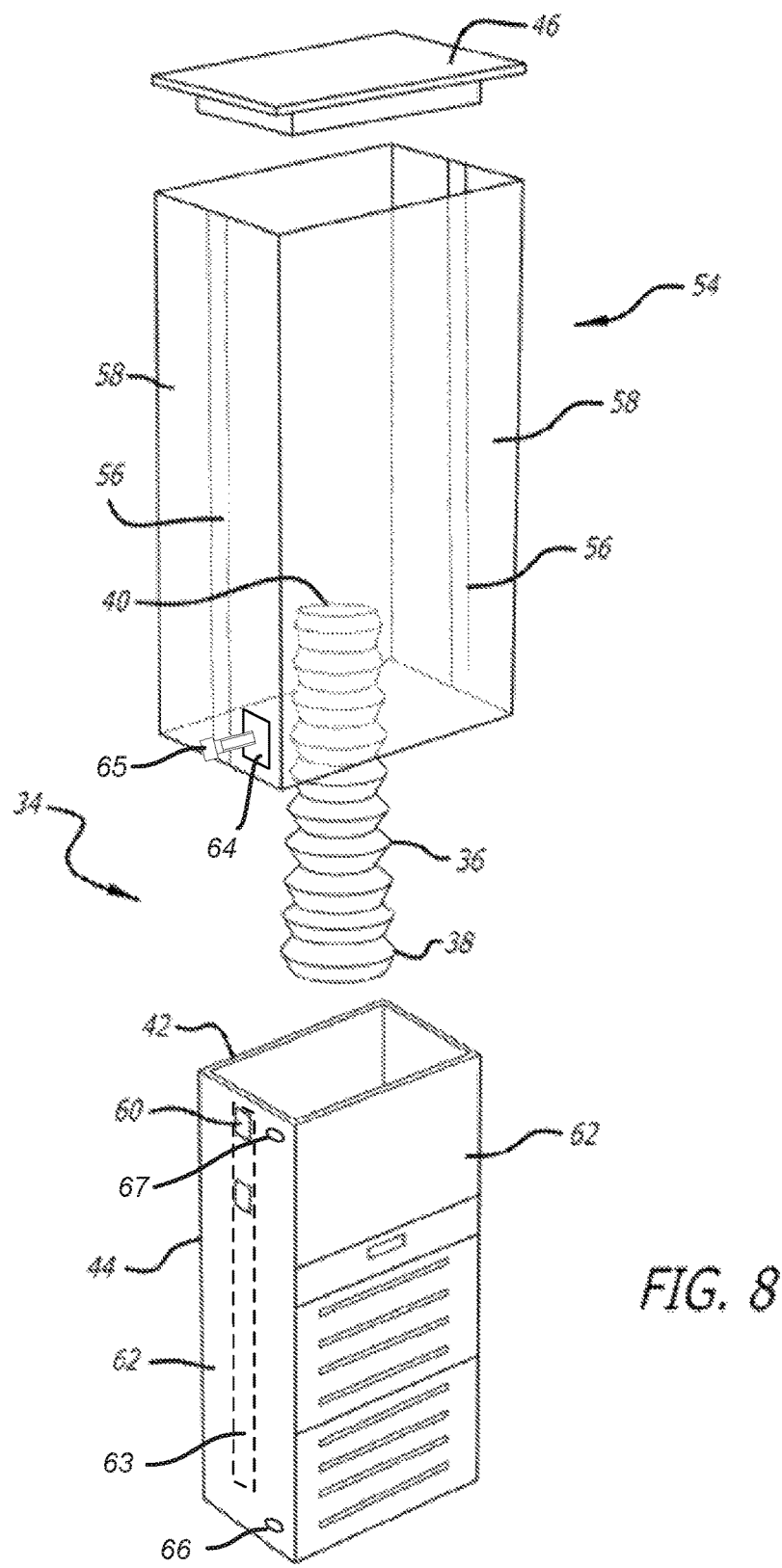
FIG. 8 is an exploded view of an embodiment of a vacuum powered lifting system according to an embodiment having air bellows.

Referring to FIG. 8, in a presently preferred aspect, the vacuum actuator 34 includes an air bellows 36 having a lower end 38 and an upper end 40. The lower end of the air bellows is typically attached to a top portion 42 of the movable component or stowage container 44, and the upper end of the air bellows is typically attached to the fixed structure. In a preferred aspect, the fixed structure includes an upper portion 46 that includes an air manifold that is connected in fluid communication with the upper end of the air bellows and that provides a source of vacuum or venting to the air bellows. In an exemplary aspect, as shown in FIG. 7, the air manifold typically includes one or more intake ports 48 for providing vacuum to the air bellows to raise the stowage container, and one or more bleed valve ports 50 for venting the air bellows to lower the stowage container. In another aspect, the fixed structure of the vacuum powered system includes a stationary stowage container structure or housing such as an above ceiling closet box 54 that houses the vacuum actuator 34.

When vacuum is provided to the air bellows through the one or more intake ports of the air manifold, for example by a vacuum pump or other vacuum device, the vacuum creates a pulling force that causes the air bellows to compress and, in turn, raise the stowage container relative to the stationary stowage container housing 54 until the stowage container reaches a raised or stowed position. When vacuum is no longer applied, pressure is vented through the one or more bleed valves of the air manifold, causing the air bellows to expand and, in turn, lower the stowage container relative to the stationary stowage container housing until the stowage container reaches a lowered or deployed position.

In another presently preferred aspect, the stationary stowage container housing 54 includes one or more elongated tracks, namely a first set of linear tracks 56, on opposing inner side walls 58 of the stationary stowage container housing or above ceiling closet box, and corresponding guide elements, namely a second set of linear tracks 63 or guides 60, on opposing outer side walls 62 of the stowage container. In one aspect, the one or more corresponding guide elements on the movable component or stowage container are movably engaged with the one or more elongated tracks in the stationary stowage container housing such that the stowage container can move between the raised position and lowered position. In a preferred aspect, the second set of linear tracks 63 are slidably connected to the first set of linear tracks 56 in the stationary stowage container housing or above ceiling closet box to provide a guiding system for sliding movement of the one or more stowage containers between the lowered or deployed position and the raised or stowed position. In a preferred aspect, the vacuum powered system includes latching systems 64, for example one or more latches 64, for releasably latching the stowage container in the lowered or deployed position and in the raised or stowed position. In one example, the latching system 64 includes a crossbar latch including a crossbar 65. When the stowage container 44 is operated at a lowered or deployed position, the crossbar 65 can be slidably inserted into an opening 67 positioned at an upper portion of the outer sidewall 62 of the stowage container 44 to secure the stowage container 44. Similarly, when the stowage container 44 is operated at a raised or stowed position, the crossbar 65 can be slidably inserted into an opening 66 positioned at a lower portion of the outer sidewall 62 of the stowage container 44 to secure the stowage container 44.

Referring to FIGS. 9-14, in a presently preferred aspect, the vacuum powered system of the present disclosure, such as for overhead stowage, includes a single acting linear vacuum actuator or dual acting linear vacuum actuator that functions similarly to a pneumatic actuator, but is actuated by negative pressure, or vacuum, instead of positive pressure.

As shown in FIGS. 9-11, a single acting linear vacuum actuator 70 includes a piston 72 with multiple seals that is housed or disposed for sliding reciprocating movement within a cylinder 74 having a first end 76 and a second end 78. The single acting linear vacuum actuator 70 utilizes vacuum provided through a vacuum hookup or vacuum connection 80 at the first end of the cylinder to provide a lifting force or pulling force for movement of the piston in a first direction 82. An actuator rod 84 is connected to the piston, extends through a seal 86 at the second end of the cylinder, and is connected to an object that is to be lifted or moved, such as a movable component or stowage container.

When vacuum is provided to the single acting linear vacuum actuator through the vacuum connection 80, the piston moves and pulls the movable component in the first direction relative to the cylinder until the movable component reaches the raised or stowed position as described previously. A bleed valve 88 is also provided at the first end of the cylinder to allow for controlled venting of the single acting linear vacuum actuator, thereby allowing the actuator rod 84, and in turn, the movable component, to move in an opposing direction 90 relative to the cylinder into the lowered or deployed position as described previously. In an aspect, the vacuum powered system includes a latching system for releasably latching the stowage container in the lowered or deployed position and the raised or stowed position.

In a presently preferred variation, the linear vacuum actuator includes a piston housed for reciprocating movement in a cylinder and is dual acting, that is, utilizing vacuum to alternatingly provide a lifting force or pulling force in opposing directions. Referring to FIGS. 12-14, a dual acting linear vacuum actuator 170 includes a piston 172 with multiple seals that is housed for sliding reciprocating movement within a cylinder 174 having a first end 176 and a second end 178. The dual acting linear vacuum actuator 170 utilizes vacuum provided through a first vacuum connection 180 at the first end of the cylinder to provide a lifting force or pulling force for movement of the piston in a first direction 182. An actuator rod 184 is connected to the piston, extends through a seal 186 at the second end of the cylinder, and is connected to an object to be lifted or moved, such as a movable component or stowage container.

When vacuum is provided to the dual acting linear vacuum actuator through the first vacuum connection 180, the piston moves and pulls the movable component in the first direction 182 relative to the cylinder until the movable component reaches the raised or stowed position as described previously. A first bleed valve 188 is provided at the first end of the cylinder to allow for controlled venting of the dual acting linear vacuum actuator, thereby allowing the actuator rod, and in turn, the movable component, to move in an opposing second direction 192 relative to the cylinder into the lowered or deployed position as described previously.

However, unlike the single acting linear vacuum actuator 70, the dual acting linear vacuum actuator 170 further includes a second vacuum connection 190 and a second bleed valve 194 advantageously provided at the second end 178 of the cylinder. The dual acting linear vacuum actuator utilizes vacuum provided through the second vacuum connection 190 at the second end of the cylinder to provide a lifting or pulling force for movement of the piston, and in turn, the movable component, in the second direction 192 relative to the cylinder until it reaches the lowered or deployed position. A second bleed valve 194 is also provided at the second end of the cylinder to allow for controlled venting of the dual acting linear vacuum actuator, thereby allowing the piston and, in turn, the movable component, to move back in the first direction 182 relative to the cylinder until it reaches the raised or stowed position. In an aspect, the vacuum powered system includes latching systems for releasably latching the stowage container in the lowered or deployed position and the raised or stowed position.

Aspects of the disclosure provide for a vertically movable storage unit that can be installed above a ceiling of an aircraft cabin. The vertically movable storage unit can include at least one vacuum-powered mechanism for raising a movable storage compartment to an above ceiling stowed position or lowering the movable storage compartment to a below ceiling deployed position. In another example, the at least one vacuum-powered mechanism can lower a movable storage compartment from a stowed position proximate the ceiling of the aircraft to a deployed position, e.g., at counter height or floor height for flight attendant access. When in the deployed position, the storage compartment can be conveniently accessed. The storage compartment can have different configurations for storing various items, such as crew member belongings, wheelchairs, passenger supplies, carry-on luggage, standard storage unit containers, and the like. In various implementations, the vertically movable storage unit can include one or more storage compartments. The vertically movable storage unit employing above-cabin open space for storage provides additional storage space for various purposes and yielded cabin usable space can be devoted to additional leg room and/or additional passenger seating area. In addition, the vertically movable storage unit can be retrofitted into an aircraft cabin without impact on functions of other existing facilities.

Figure 15A:
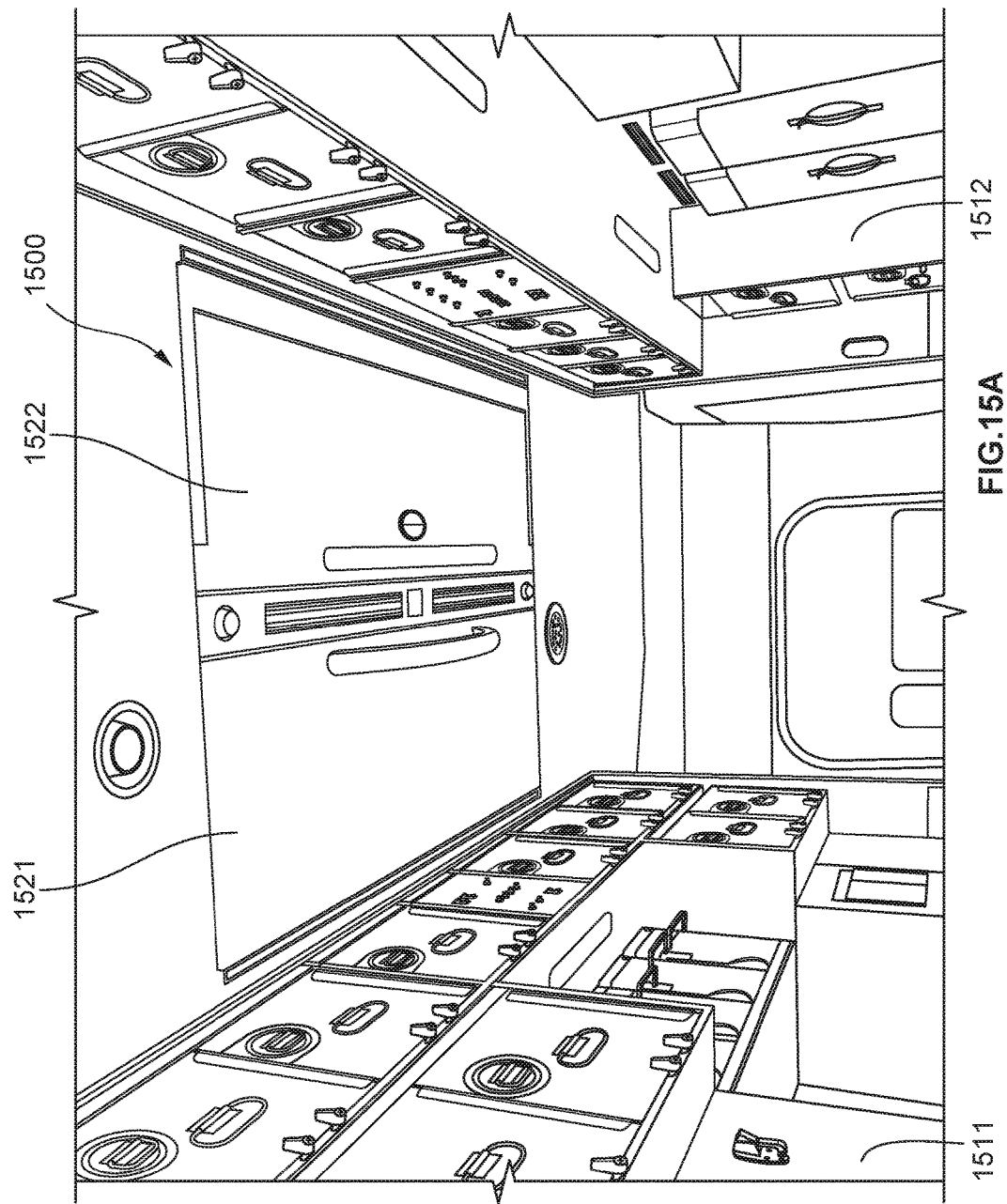
Figure 15C:
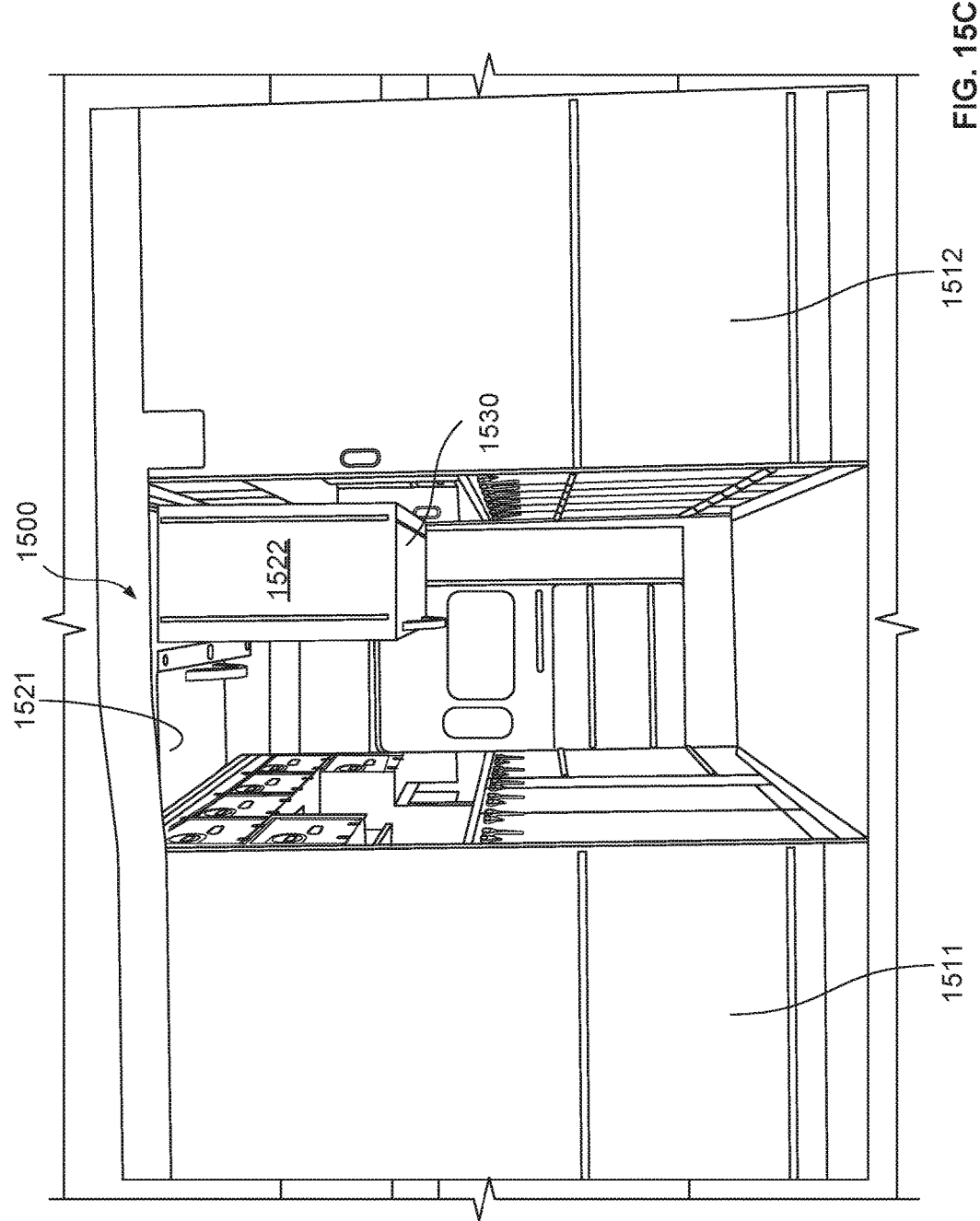

FIGS. 15A through 15C show an example vertically movable storage unit 1500 installed above a ceiling over a cross aisle between two galley monuments 1511, 1512 in an aircraft galley complex. As shown, the storage unit 1500 includes two storage compartments 1521, 1522 arranged in a mirrored way and the sides accessible to the two storage compartments 1521, 1522 are faced to each other. In FIG. 15A, the two storage compartments 1521, 1522 are both in a stowed position. In FIG. 15B, the storage compartment 1521 is in a deployed position, while the storage compartment 1522 is in a stowed position. In FIG. 15C, the storage compartment 1522 is in a deployed position, while the storage compartment 1521 is in a stowed position. When in the deployed position, a bottom panel 1530 of the storage compartments 1521, 1522 reaches a level proximate the countertop of the galley monuments 1511, 1512.

In one example, moving of the two storage compartments 1521 and 1522 can be controlled, for example by an electrical control unit, in a way that only one of the two storage compartments 1521, 1522 can be lowered to the deployed position at a time. In this way, the across aisle of the galley complex would not be fully blocked, and the cross aisle is usable while one of the two storage compartments 1521, 1522 is being accessed. In other examples, the two storage compartments 1521, 1522 may be arranged back to back, or side to side, or in any other suitable arrangement. Also, moving of one of the two storage compartments 1521, 1522 may be operated without restriction of the other one's position (lowered position or raises position).

Figure 16:
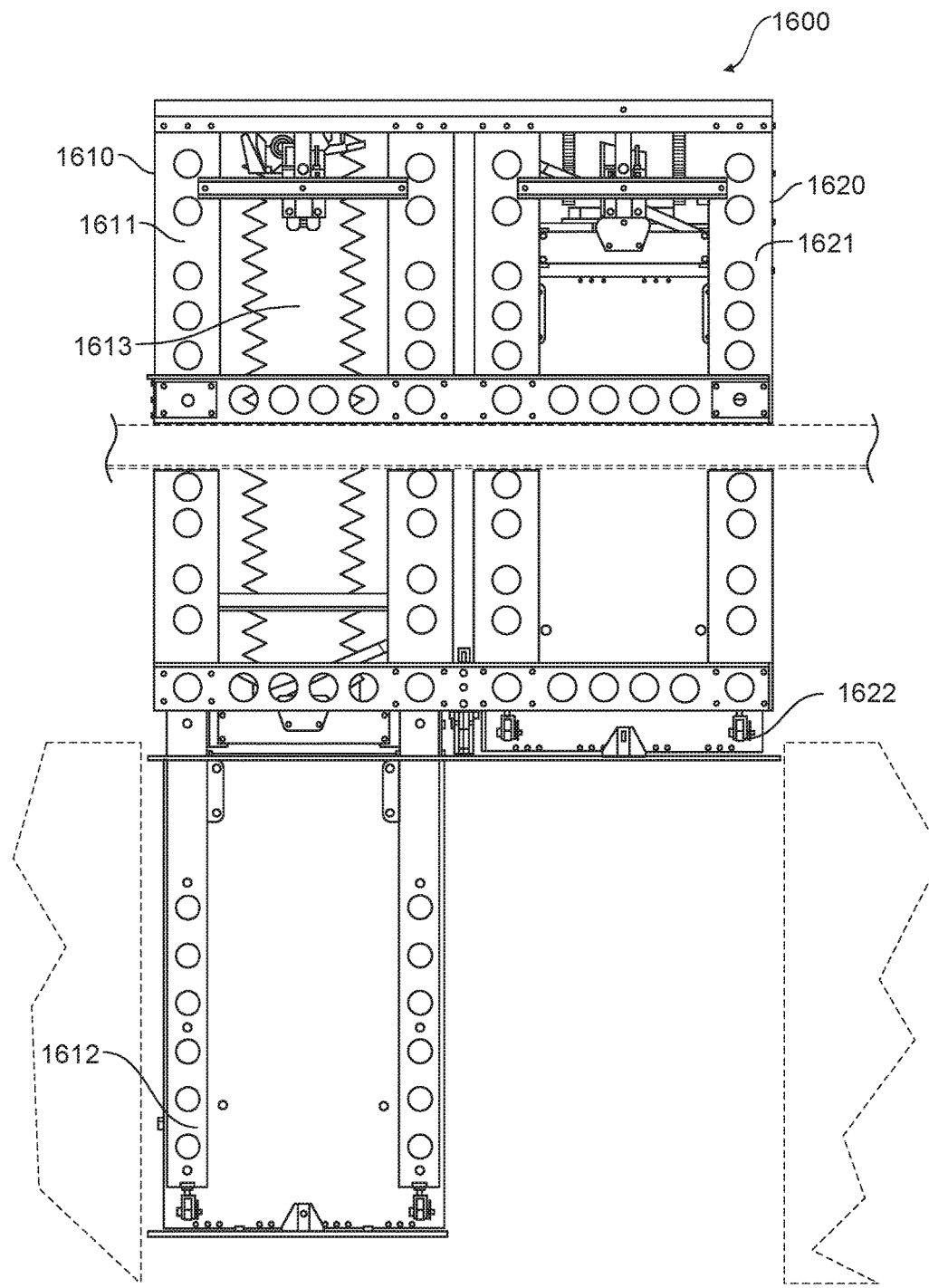
FIG. 16 shows a vertically movable storage unit according to some embodiments of the disclosure.

FIG. 16 shows a vertically movable aircraft storage unit 1600 according to some embodiments of the disclosure. The storage unit 1600, in some embodiments, includes two mirrored storage subsystems 1610, 1620 having similar structures, thus being referred to as a twin boxes system. In other implementations, the aircraft storage unit 1600 includes more or fewer subsystems. For example, the storage unit 1600 may include a single "box". In multiple box systems, some components, such as the control unit, vacuum source, above ceiling housing structure, and the like, can be shared among the subsystems thus making the storage unit 1600 more compact and usage of space more efficient.

As shown, in some implementations, each subsystem 1610, 1620 includes an overhead mounting frame 1611, 1621, a storage compartment frame 1612, 1622, and a vacuum powered moving mechanism 1613, 1623, respectively. The overhead mounting frames 1611, 1621 can be installed above an aircraft ceiling. The two overhead mounting frames 1611, 1621 can be integrated into a single structure in some examples. The vacuum powered moving mechanism 1613, 1623 can be an air bellows, a single acting linear vacuum actuator, a dual acting linear vacuum actuator, and the like in various examples. Each of the storage compartment frames 1612, 1622 can be configured for receiving a storage compartment. The storage compartment can have various forms for various purposes, and can be customized according to requirements of customers.

During operation, the vacuum powered moving mechanisms 1613, 1623 can raise the storage compartments 1612, 1622 to a stowed position (raised position) or lower the storage compartments 1612, 1622 to a deployed position (lowered position). FIG. 16 shows the storage compartment 1612 in a lowered position while the storage compartment 1622 in a raised position.

Figure 17A:
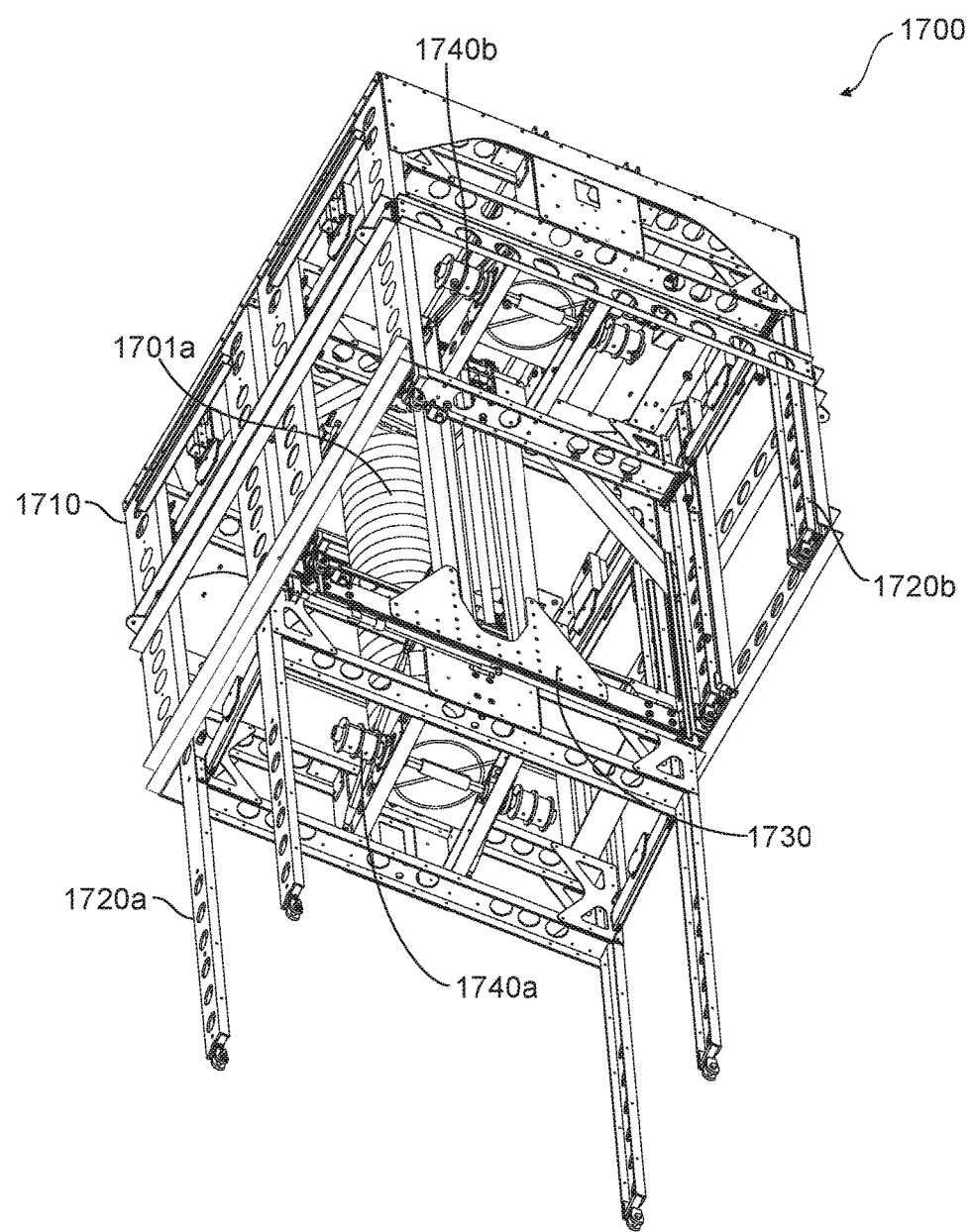
FIG. 17A shows internal structures of a vertically movable storage unit according to some embodiments.

FIG. 17A shows internal structures of a vertically movable storage unit 1700 according to some embodiments. Wall panels have been removed to expose internal structural frameworks enabling the functionality of the storage unit 1700. FIGS. 17B through 17E illustrate various components of the storage unit 1700 in greater detail. As shown in FIG. 17A, the storage unit 1700 includes an overhead mounting frame 1710, two vacuum powered lift mechanisms (only one 1701a is shown), two storage compartment frames 1720a, 1720b, a manual override mechanism 1730, and two rotary-to-linear dampening mechanisms 1740a, 1740b. The vacuum powered lift mechanism 1701a, the storage compartment frame 1720a, and the rotary-to-linear dampening mechanism 1740a from a first storage subsystem, while the other vacuum powered lift mechanism (not shown), the storage compartment frame 1720b, and the rotary-to-linear dampening mechanisms 1740b from a second storage subsystem. The two subsystems share the same overhead mounting frame 1710 and the manual override mechanism 1730. In FIG. 17A, one of the storage compartment frame 1720a is in a deployed position, and the other one 1720b is in a raised position.

In some implementations, a vacuum-actuated aircraft storage unit includes a manual override mechanism for raising and/or lowering a storage cabinet without use of the vacuum lift mechanism. The manual override mechanism, for example, can be used in the event of an electrical failure, a vacuum actuator failure, or other failure of the vacuum lift mechanism.

The manual override mechanism, in some embodiments, includes a lead screw assembly 1730, as illustrated in FIG. 17A. The lead screw assembly 1730 can be used to manually lift the storage compartment frame 1720a or 1720b from a lowered position to a raised position during failure of the vacuum actuators, for example, leakage of an air bellows. In FIG. 17A, the lead screw assembly 1730 is fixed to the structure of the overhead mounting frame 1710 between the two subsystems. FIG. 17D shows an example lead screw assembly 1730 which includes a manual override mounting frame 1736 for fixing the lead screw assembly 1730 to the overhead mounting frame 1710. The lead screw assembly 1730 further includes a lead screw 1734 with a moving structure 1735 engaged to the lead screw 1734, and a manual control mechanism (e.g., a hand crank) 1731 connected to one end of the lead screw 1734 through a mechanical linkage 1733. The mechanical linkage 1733 and the lead screw 1734 form a rotary-to-linear drive mechanism. The manual control mechanism 1731 can include a handle 1732, a pivot 1739 for stowing the handle against a lower surface of the mounting frame 1736, and a clip 1737 for retaining the handle 1732 against the lower surface of the mounting frame 1736, as shown in FIGS. 17D and 17E. During operation, the handle 1732 can be released from the clip 1737 and pivoted into a vertical in-use position for turning the hand crank 1731. A grip portion of the handle 1832, further, may be released from a slot. As a result, the moving structure 1735 can move along the lead screw while engaged with the lead screw 1734. The moving structure 1735 can be releasably attached to a storage compartment frame 1720a, 1720b when an actuator failure takes place for lifting the storage compartment frame 1720a, 1720b. In other examples, the lead screw assembly 1730 can be used for lifting a storage compartment to any position between the deployed position and the stowage position for maintenance purpose.

In other implementations, the manual override mechanism includes a hydraulic cylinder and pump (not illustrated) to push the storage compartment back into the stowed position from the deployed position and vice-versa. A foot pedal mechanism in communication with the manual override mechanism, for example, may be stowed in a deployable location against a galley monument such that, in the event of failure of the vacuum lift mechanism, a flight attendant may lower the foot pedal to an operational position and manually move the storage compartment using the foot pump. A switch presented on a control panel, in some embodiments, may allow the crew member to select between a raise and a lower manual operation of the hydraulic cylinder and pump manual override mechanism.

In further implementations, the storage compartment is biased using a spring load mechanism (not illustrated) such that, for example, 90% of the weight of an empty storage compartment is held aloft by the strength of the spring biasing. In this manner, for example, gravity may work to lower the storage compartment from the stowed position without use of the vacuum lift mechanism, while one or two crew members may overcome the gravitational force of the weight loaded into the storage compartment, manually pushing the storage compartment back into a stowed position. In one example, the spring load mechanism comprises one or more gas springs. In another example, the spring load mechanism comprises a constant force spring, for example returnable to its rolled position using a small motor.

In additional implementations, a rack and pinion assembly (not illustrated) is used as a manual override mechanism for moving the storage compartment from a deployed position to a stowed position and vice-versa in the event of failure of the vacuum lift mechanism. The rack & pinion system, for example, can use a worm drive, actuated by a manual control mechanism such as the hand crank 1731 described in relation to FIGS. 17D and 17E.

In certain embodiments, a dampening mechanism provided to control movement of the storage compartment between the raised and lowered position may be used as a manual override mechanism to manually translate the position of the storage compartment. For example, a ratchet wrench manual override mechanism can be added to a rotary-to-linear damping mechanism (described in greater detail below) to manually crank the cables of the rotary-to-linear damping mechanism between the raised and lowered position of the storage compartment. In another example, a damping mechanism useful for manual override of the vacuum lift mechanism may include a capstan for friction dampening.

In some implementations, a vertically movable storage unit includes a dampening system to control the speed of lowering or raising storage compartments. The dampening system, for example, can be used to avoid damage to other aircraft components and/or injury to aircraft personnel while manipulating the vertically movable storage unit. The dampening system, in another example, may provide a back-up safety mechanism to retain the storage compartment in its suspended position, for example in the event of a broken vacuum lift mechanism which pulls away from the storage compartment.

A rotary-to-linear dampening mechanism 1740a, 1740b, in some embodiments, can be used to control the speed of lowering or raising the storage compartment frames 1720a, 1720b such that the storage compartment frames 1720a, 1720b can move smoothly at a configured speed. FIG. 17C shows an example rotary-to-linear dampening mechanism. In FIG. 17C, the rotary-to-linear dampening mechanism includes a rotary damper 1741 which can be fixed to a top portion of each storage compartment frame 1720a, 1720b. The rotary dampener 1741 can include two drums 1742. A cable can be wound to each drum 1742 with one cable fixed to a bottom portion of the overhead mounting frame 1710 and the other cable to a top portion of the overhead mounting frame 1710. A pulley (not shown) attached to one side of each storage compartment frame 1720a, 1720b can be used to convert the rotary dampening to linear dampening by engaging each cable.

In other embodiments, a constant force spring (not illustrated) may be used as a dampening mechanism. For example, one or more constant force springs may be connected to the storage compartment to control its travel in the downward direction. The constant force spring(s) may be configured for coiling using a low-power motor upon lift of the storage compartment into the stowed position.

In further embodiments, a rack and pinion with a grease damper may be used to slow the travel of the storage compartment during lowering and lifting. The pinion gear shaft, for example, may be slowed by a grease damper.

In additional embodiments, to dampen movement, air intake and release for the vacuum lift mechanism may be controlled such that the travel capacity of the vacuum lift mechanism is constrained.

In FIG. 17A, only one vacuum actuator (an air bellows) 1701a is employed for each subsystem. However, in other examples, more than one vacuum actuator can be employed in one subsystem in order to increase the weight-lifting capacity of the corresponding subsystem. In a particular example, the weight-lifting capacity of one subsystem employing one air bellows can be increased from 100 pounds to 200 pounds when two air bellows are employed. Further to this example, for each increase of approximately 100 pounds, an additional bellows may be employed. Additionally, for redundancy, the system may be designed with two vacuum lift mechanisms, such as two bellows, rather than one, even if one is rated to lift the specified weight of the particular storage compartment.

In some implementations, an aircraft storage unit includes a latching system for locking the aircraft storage unit in its stowed position. The latching system, for example, can automatically engage with a storage compartment frame when the storage compartment frame is lifted to the stowed position, and lock the storage compartment frame to the stowed position.

Figure 17B:
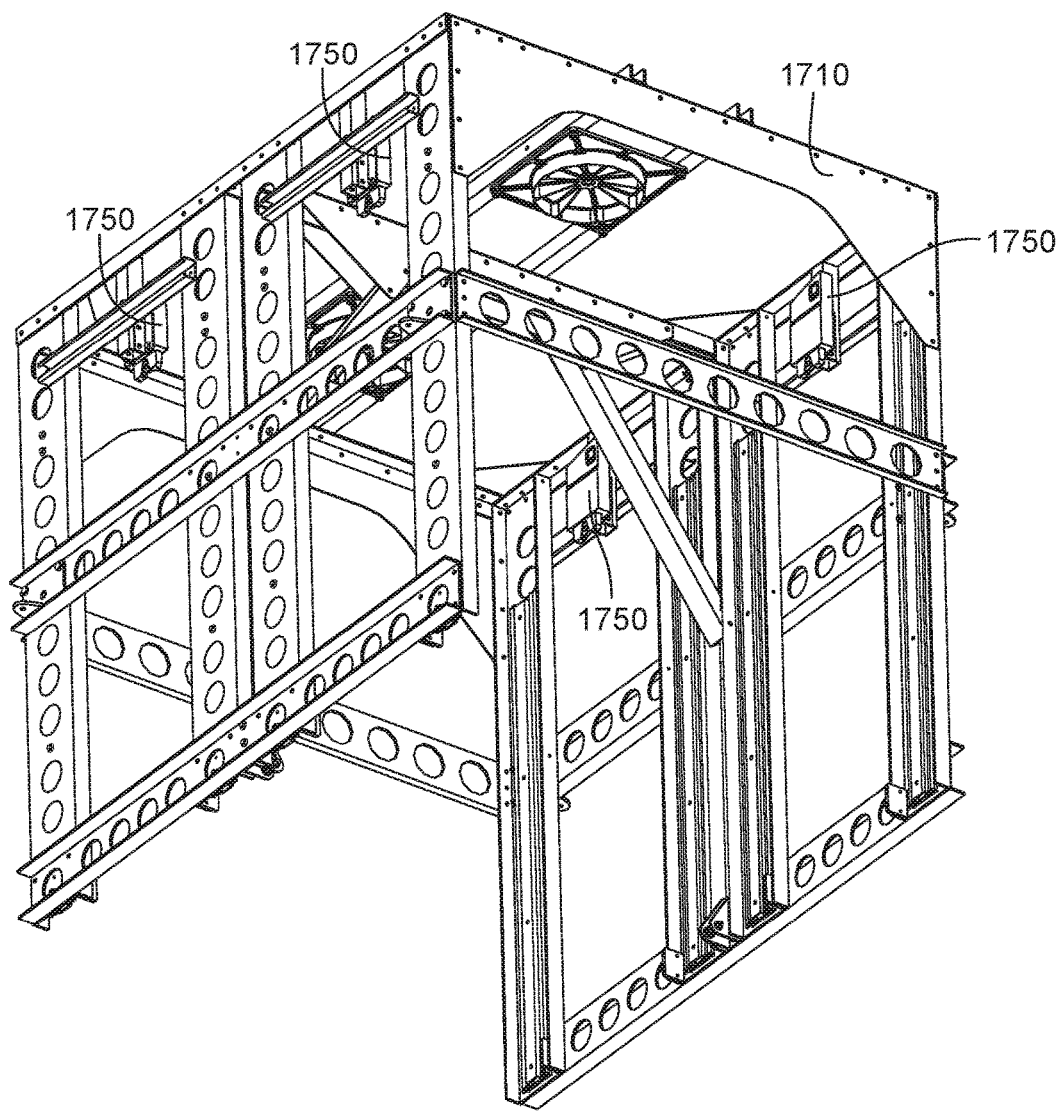
FIGS. 17B through 17E illustrate various components of the storage unit in FIG. 17A in greater detail.
Figure 17C:
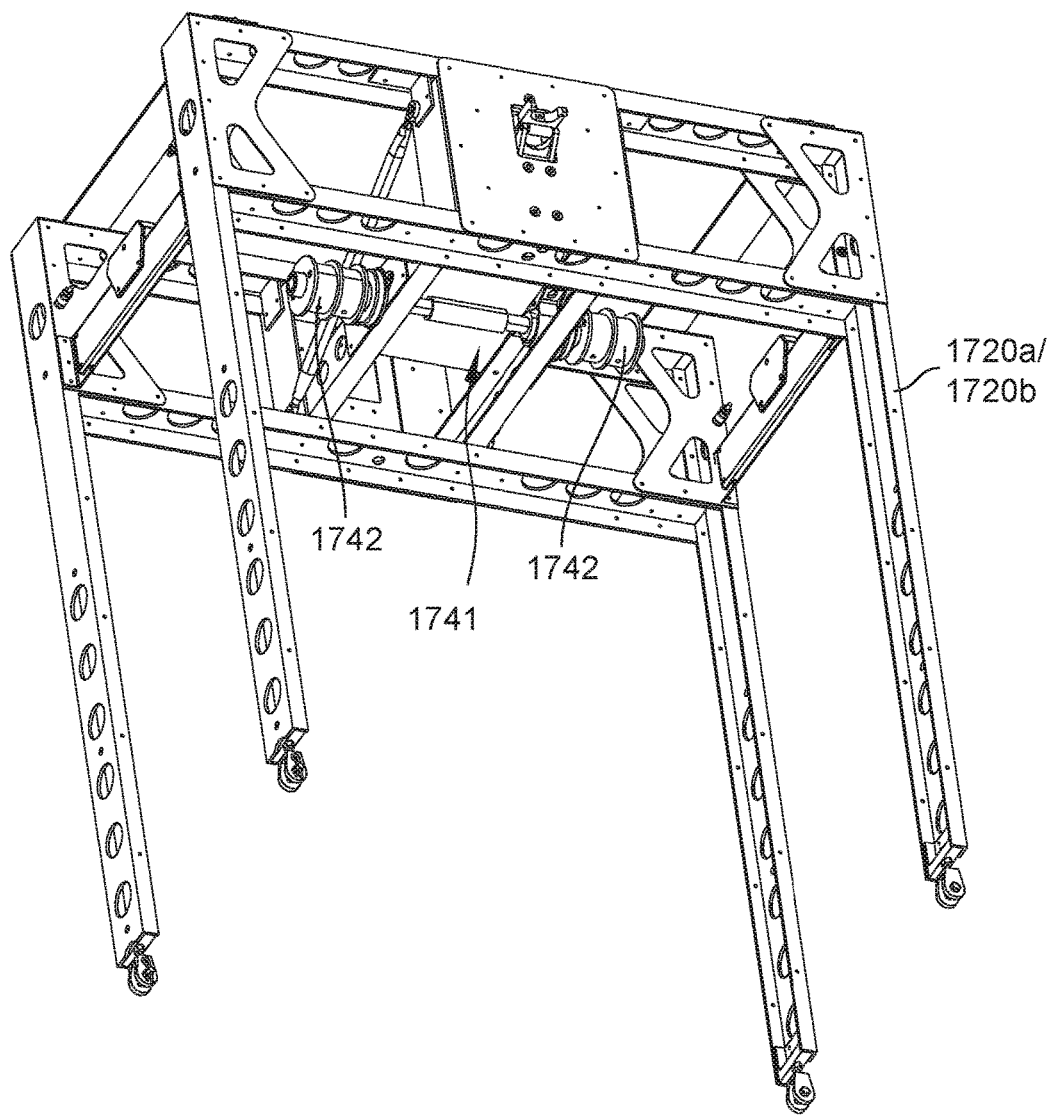
Figure 17D:
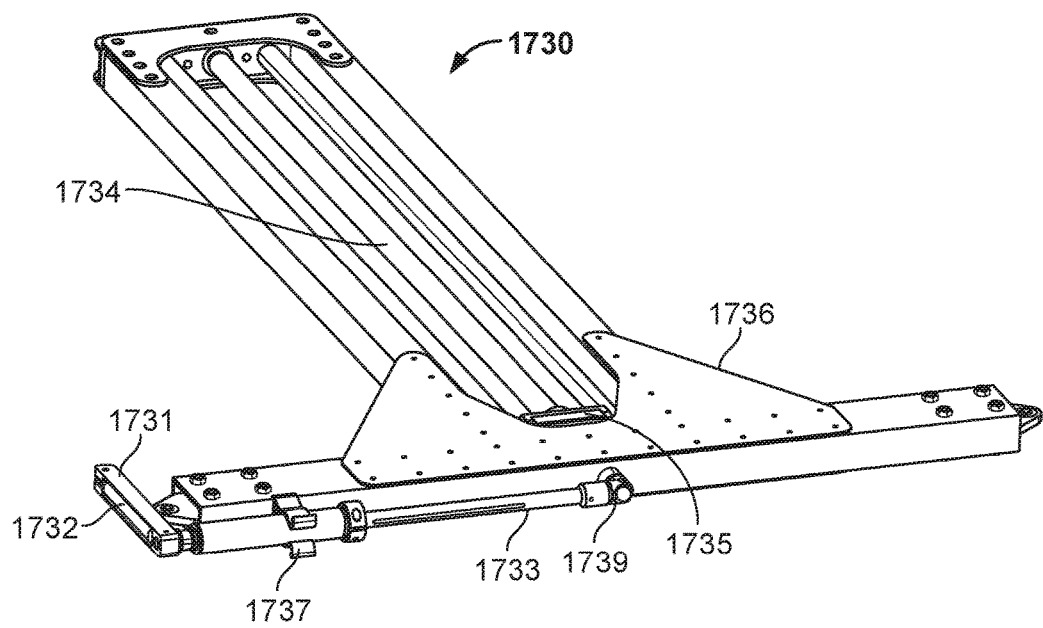
Figure 17E:
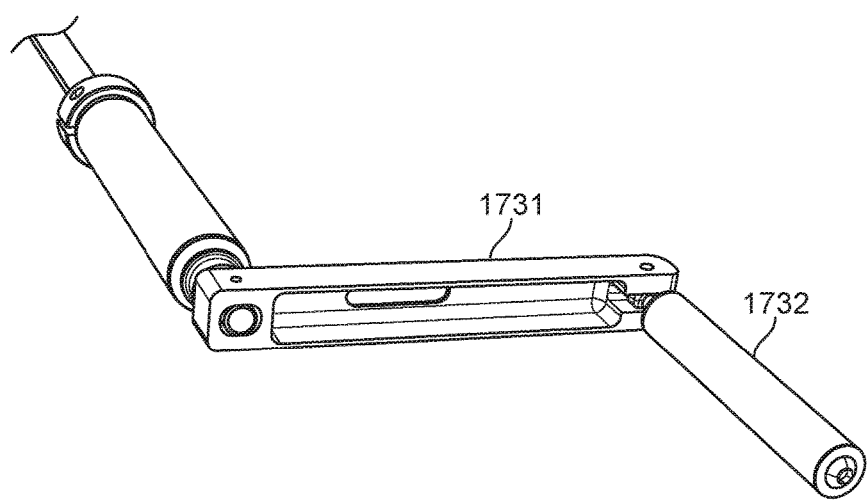

As shown in FIG. 17B, in some embodiments, an electrical latching system is used to lock top corners of the storage frame into a stowed position. The electrical latching system can be used as a sole latching system in a storage unit, or it can cooperate with another latching system as a backup latching system. In one example, the electrical latching system includes one or more electrical latches 1750 for latching a storage compartment. In one example, a pair of electrical latches 1750 is installed at opposite top portions of the overhead mounting frame 1710 for locking a raised storage compartment. In operation, an electrical latch 1750 can detect that a storage compartment has reached the top-most position and automatically engage a latch of the electrical latch 1750 to a locking position for locking the storage compartment. Before a storage compartment lowering operation, the electrical latch 1750 can be disengaged, for example, by a user-actuated control (e.g., button, touch screen control, etc.) disposed within the galley area. For example, the user-actuated control may be mounted to one of the galley monuments 1610a, 1610b. In one example, the user-actuated control is implemented with an integrated circuit. When a user actuates the control, for example, by push a button, the user-actuated control can detect the actuation action and transmit a control signal to the corresponding electrical latches 1750. As a response, the corresponding electrical latches 1750 can disengage the latches locking storage compartments.

In other embodiments, the mounting frame includes one or more mechanical latches for automatically engaging the storage frame upon arrival of the storage compartment in its stowed position. The mechanical latches, for example, may include electrical releases, such as a solenoid release mechanism, to unlock the storage compartment for lowering to its deployed position. Further, a mechanical override may be provided to mechanically release the upper latches, for example in the event of electrical failure.

In further embodiments involving a constant force spring mechanism for spring loading the weight of the empty storage compartment, the position of the constant force spring may be locked to lock the position of the storage compartment.

In some embodiments, a vertically movable aircraft storage unit includes a crash avoidance system. For example, one or more sensors can be disposed on the bottom of a container 1512, 1522 which can detect existence of an object, for example, a human or obstacle, below the container. During a lowering operation, when sensors detect existence of object, a control signal can be transmitted to a control mechanism to stop the lowering operation, for example, by introducing vacuum to the vacuum actuator. In one example, the control mechanism uses a relay to trigger a mechanical switch to stop and/or reverse operation of the vacuum lift mechanism. In another example, an integrated-circuit-implemented control unit may receive a signal from the sensors regarding the sensed obstacle and trigger the vacuum lift mechanism to stop and/or reverse course. The sensors, for example, may be positioned at about a height of a flight attendant's head to avoid impact with personnel during deployment. Other sensors may be positioned, in some examples, proximate the aircraft ceiling (e.g., to avoid impact with opened standard units of a galley monument), at about a shoulder height of a flight attendant (e.g., to avoid impact with items extending from a countertop region of the galley monument) and/or proximate a floor of the aircraft (e.g., pointing up at the vertically movable aircraft storage unit to identify any objects within the downward path of the storage compartment).

The storage compartments of a vertically movable aircraft storage unit, in some embodiments, include an open front cabinet configured to accept a variety of contents. The storage compartments, further, may be designed for swapping between contents. The storage compartments, for example, may be designed for quick release and attachment to the storage compartment frame. In this manner, a first type of storage compartment frame (e.g., coat rack) may be swapped out for a second type of storage compartment frame (e.g., wheelchair storage) depending upon the present needs of the airline by wheeling in a new storage compartment, disengaging the currently installed storage unit, and installing the new storage unit to the vertically movable aircraft storage unit. Various storage compartments may include, in some examples, shelves, bins, one or more doors, a coat rack, and retention devices for releasably retaining particular types of equipment, such as retention belts for securing a wheelchair into a wheelchair storage compartment. FIGS. 18 through 22 illustrate various example configurations for storage compartments.

Figure 18:
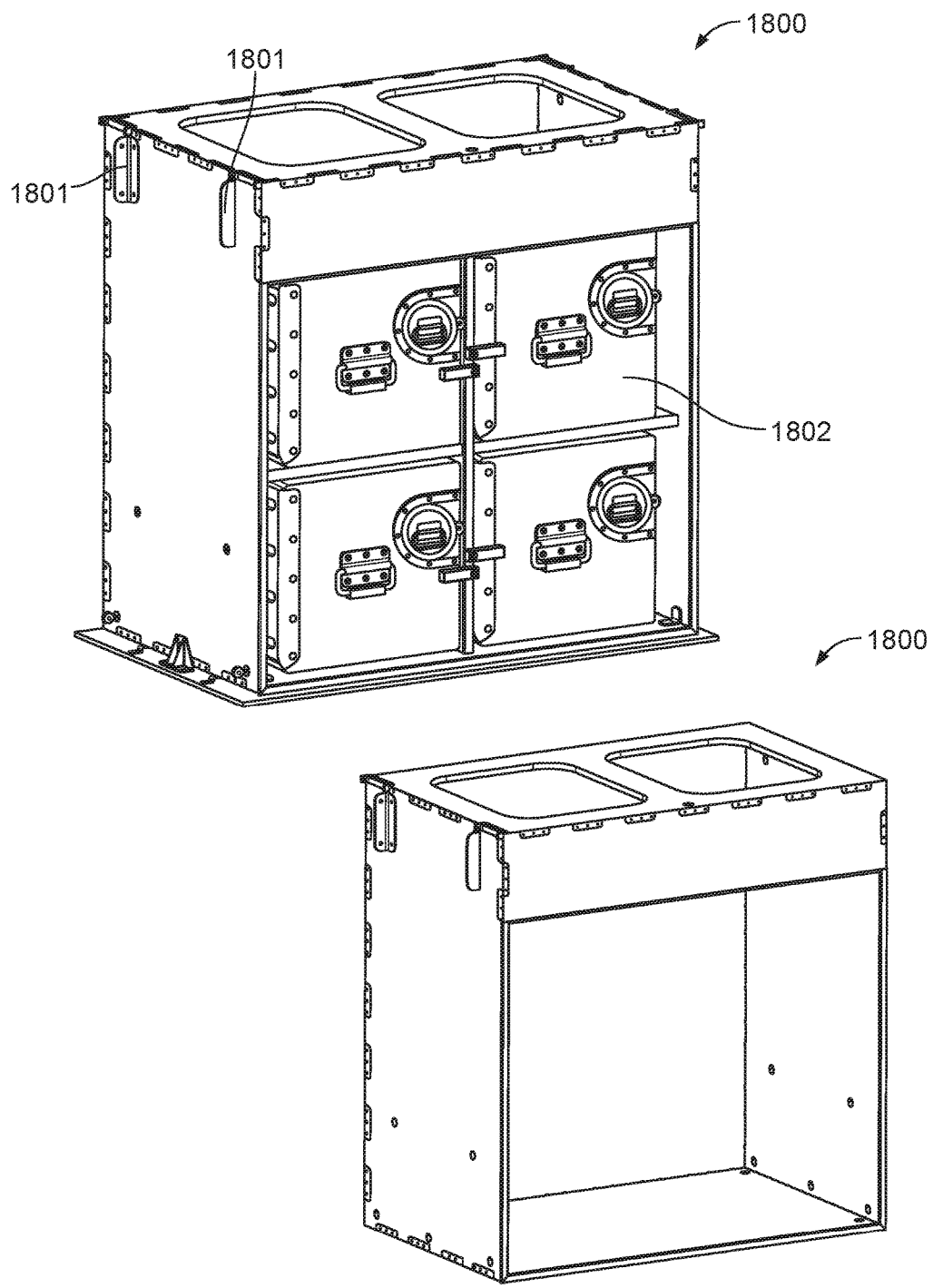
FIG. 18 shows an example of a storage compartment according to an embodiment.

FIG. 18 shows an example of a storage compartment 1800 according to an embodiment. The storage compartment 1800 can be attached to a storage compartment frame such as the storage compartment frames 1720a, 1720b discussed in relation to FIG. 17A, for example, using one or more fixing provisions 1801 (e.g., releasable pins as illustrated). In other examples, the storage compartment frame 1720a, 1720b can be embedded into the compartment 1800. The storage compartment 1800, in some implementations, includes one or more openings, such as the two openings illustrated, to vent air pressure during changes in cabin pressure.

As shown in FIG. 18, the storage compartment 1800 is configured for storing four aircraft galley standard unit containers 1802. The storage compartment 1800, for example, may be configured for deployment as an over-the-counter galley compartment unit as illustrated, for example, in a left galley monument of FIG. 15C. In another example, the storage compartment 1800 may be configured for deployment from a ceiling-stowed vertically movable storage unit, such as the galley storage illustrated in FIG. 19.

Figure 19:
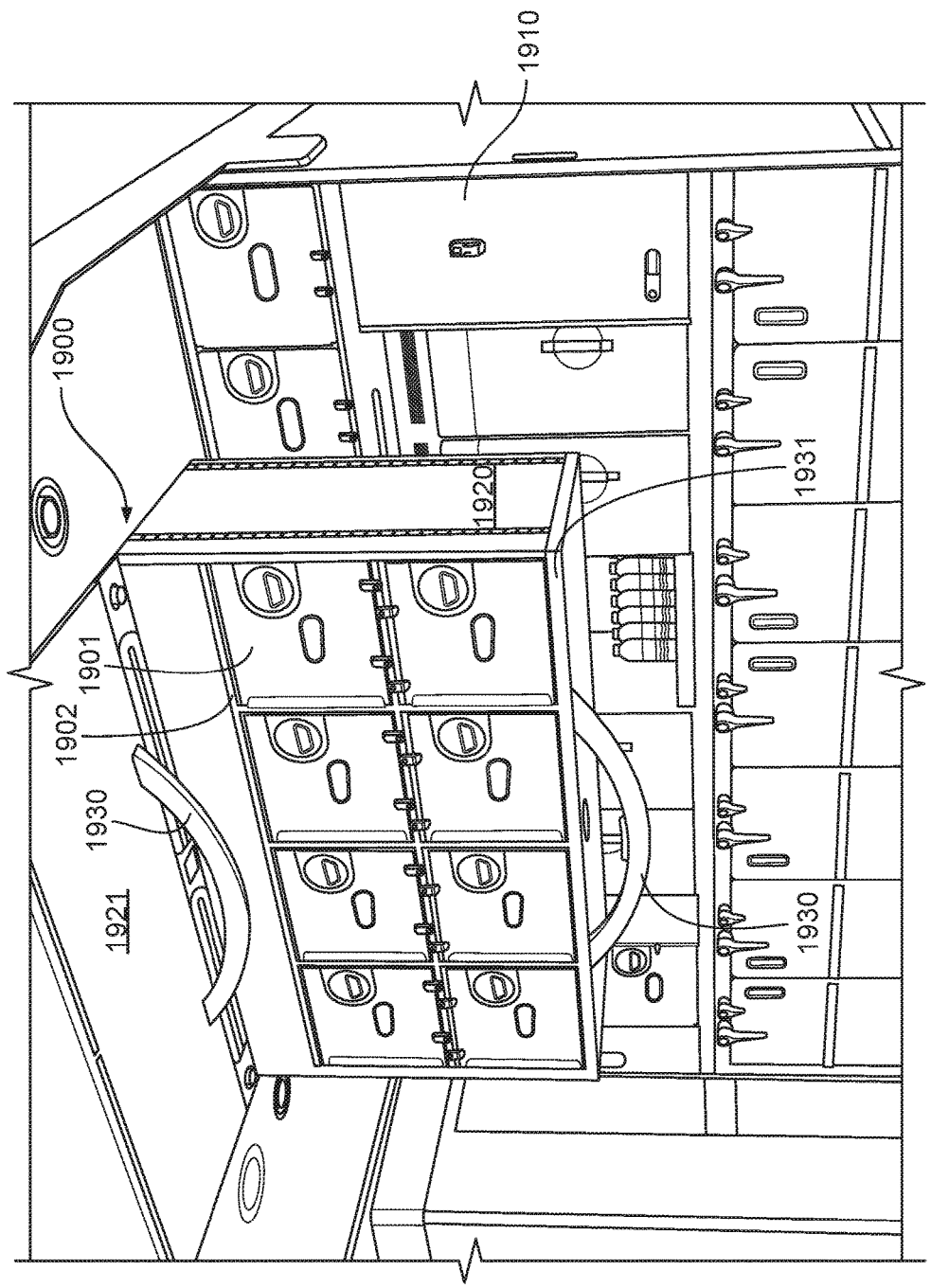
FIG. 19 shows an aircraft vertically movable storage unit according to an example.

Turning to FIG. 19, a vertically movable aircraft storage unit 1900, in some embodiments, may be configured for installation above a ceiling over a crossover aisle between two galley monuments (only one 1910 is shown) in a galley complex of the aircraft cabin. The unit 1900, for example, includes two storage containers (storage compartments) 1920 and 1921 with the storage compartment 1920 in a deployed position and the storage compartment 1921 in a raised position. As shown, the storage compartment 1920 is configured for storage of eight aircraft galley standard unit containers 1901 on a standard container rack 1902. In one example, the rack 1902 can be removed such that the container 1920 can be configured for other stowage options. Further, each container 1920, 1921 has a handle 1930 attached to a lower panel 1931 of each container 1920, 1921.

Figure 20:
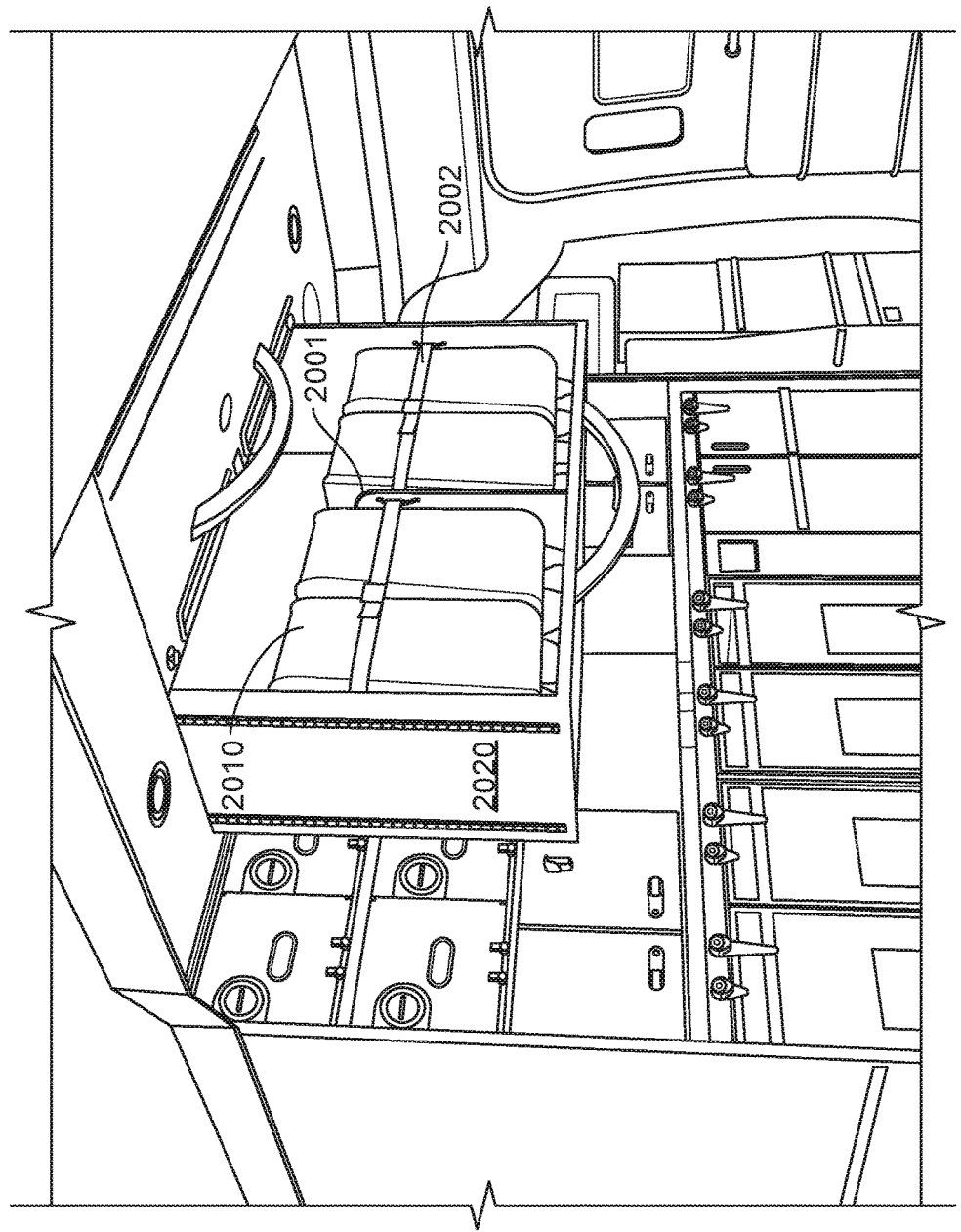
FIG. 20 shows another aircraft vertically movable storage unit according to an example.

FIG. 20 shows another vertically movable aircraft storage unit 2000 according to an example. Similarly, the storage unit 2000 is installed above a ceiling of an aircraft galley complex. However, one container 2020 is configured for storage of carry-on luggage 2010 which are fixed by straps 2002 attached to a removable divider 2001 and sidewalls of the container 2020.

Figure 21A:
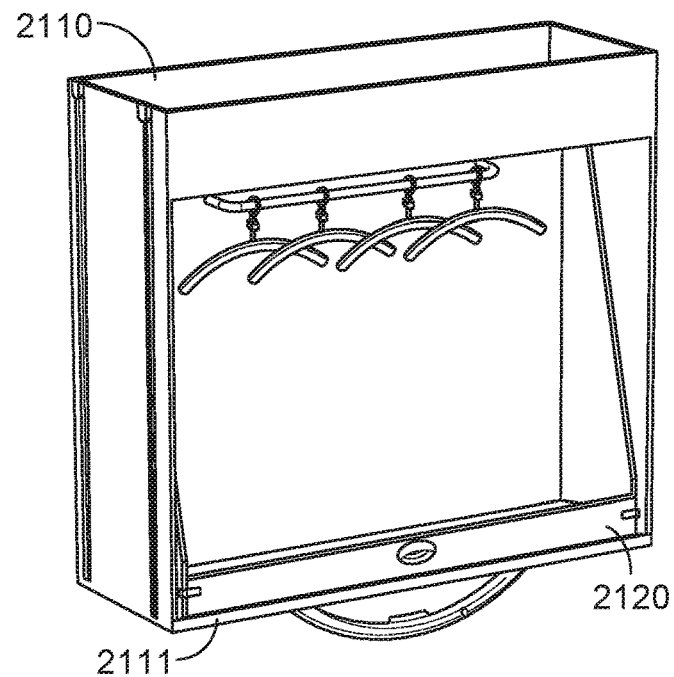
FIGS. 21A and 21B show a storage container enclosing a retractable and removable stowage shelf in different operational states according to an example.
Figure 21B:
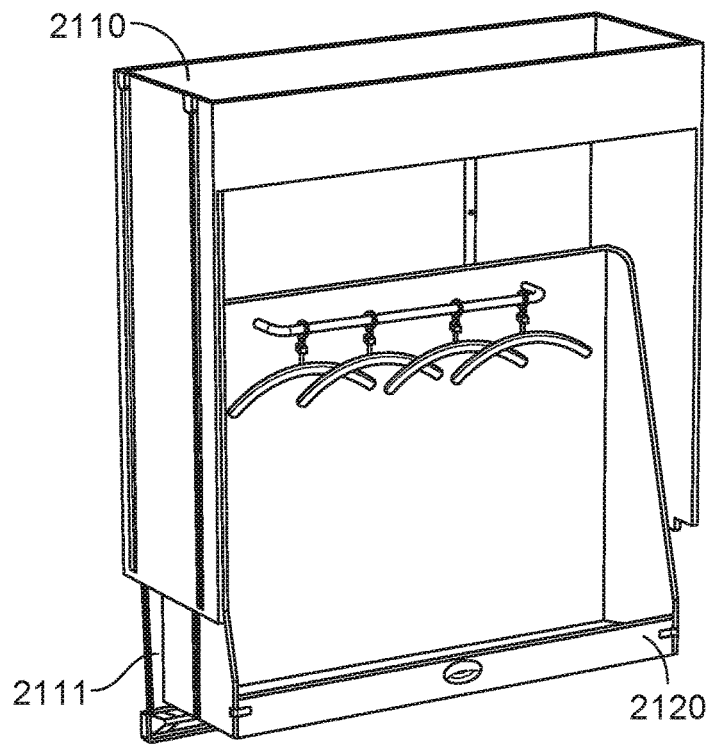

FIGS. 21A and 21B show a storage container 2110 enclosing a retractable and removable stowage shelf 2120 according to an example. In one example, the stowage shelf 2120 is configured to be a coat closet (a garment rack) 2120 for storing clothes. In FIG. 21A, the stowage shelf 2120 is in a retracted position where the lower panel 2111 of the container 2110 is in a closed position, while in FIG. 21B the stowage shelf 2120 is moved to a dropped position where the lower panel 2111 of the container 2110 is in an opened position making access to the stowage shelf 2120 more convenient. In one example, the stowage shelf 2120 can be dropped proximate the aircraft cabin floor, while the bottom of the storage compartment lowers to approximately waist height above the floor. In this manner, the translating shelf allows the operator to safely and easily stow and remove heavy and/or bulky items, such as a wheelchair.

Figure 22:
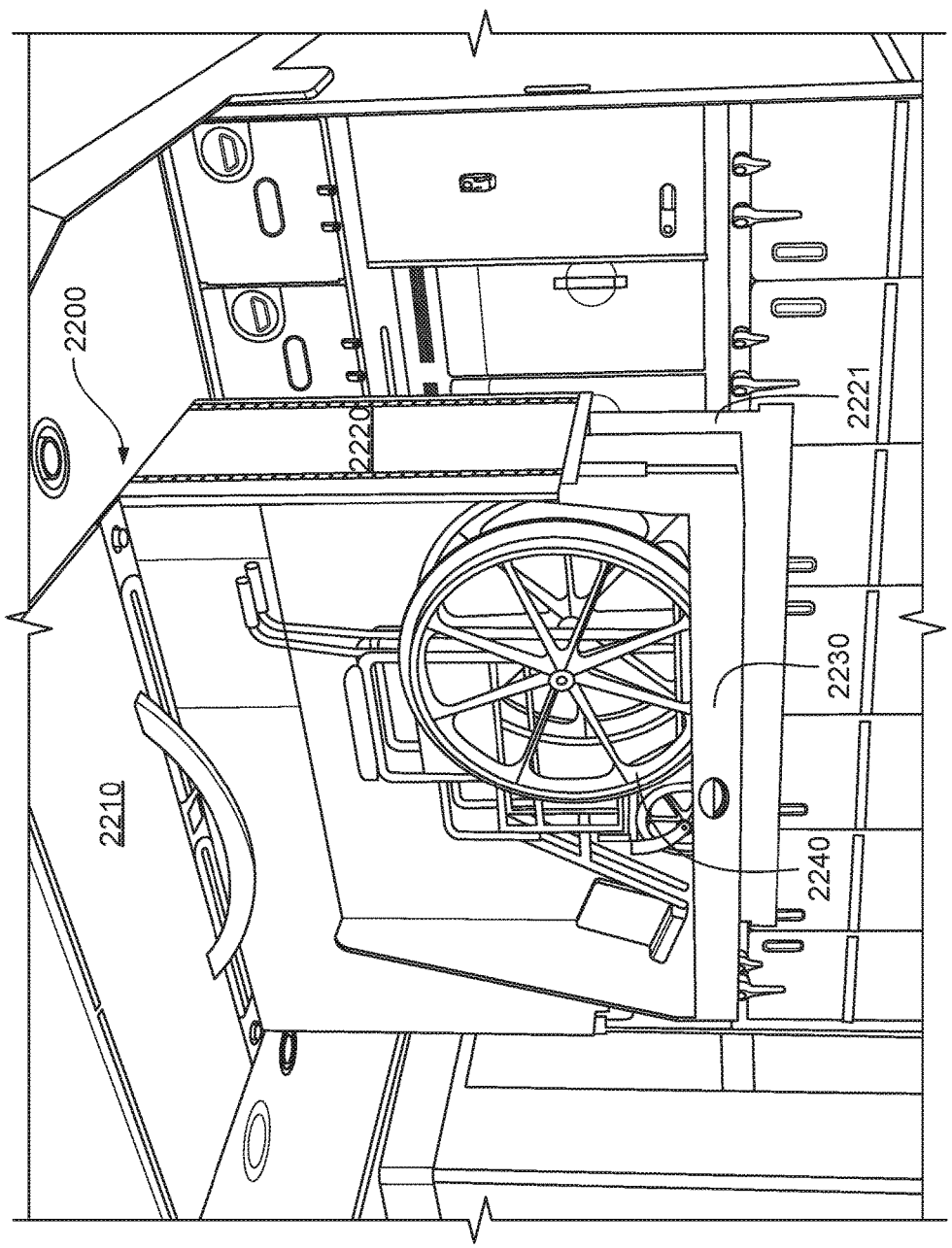
FIG. 22 shows a further aircraft vertically movable storage unit according to an example.

FIG. 22 shows a further vertically movable aircraft storage unit 2200 according to an example. Similarly, the unit 2200 is installed above a ceiling in an aircraft galley complex, and includes two storage containers 2210 and 2220 with one container 2220 in a deployed position. The container 2220 is configured to enclose a retractable and removable stowage shelf 2230 for storage of a standard sized wheelchair 2240. As shown, the lower panel 2221 of the container 2220 is in an opened position. In one example, the stowage shelf 2230 can be dropped proximate the floor of an aircraft cabin such that heavy items can be moved out of the stowage shelf 2230 conveniently.

FIGS. 23A-23E illustrate a manual release mechanism 2300 according to an example. A manual release mechanism, for example, provides a means for a user to actuate a mechanical locking mechanism for securing a storage container in its stowed position. The manual release mechanism, for example, may be used as a back-up locking mechanism in the event that a primary locking mechanism, such as the electrical latching mechanism 1750 described above, malfunctions. In other embodiments, the manual release mechanism may function as a primary or sole locking mechanism for the aircraft storage unit. As shown by FIG. 23A, in some embodiments, a storage container 2301 of an aircraft storage unit includes an assistance handle 2310 attached to a lower panel 2302 of the container 2301. A button of the latch system 2300 is disposed above and at the middle of the handle 2310.

FIG. 23B shows a cross sectional view of the assistance handle 2310 where a latch bolt assembly 2320 is enclosed and integrated in the assistance handle 2310. As default (as shown in FIG. 23D), the button 2311 is supported by a spring 2323 to be positioned at an upper position 2322a. When the button 2311 is compressed (as shown in FIG. 23C), the position 2322 moves to a lower position 2321a. As a result, latch bolts 2320 are extended from a first location 2322b to a second position 2321b (in FIG. 23B), which disengages the bolt assembly to an unlatched state from a latched state. FIG. 23E shows a latched state of the latch bolt assembly 2320 corresponding to FIG. 23D where the latch bolt 2320 is engaged with a latch strike assembly 2340 preventing the container 2301 from changing its position.

In operation, when the container 2301 is in the raised location, the latch bolt assembly 2320 is in the default latched position, thus the container 2301 is secured at its current location. After a vacuum powered lifting mechanism is actuated for lowering the container 2301, for example, by pushing a button of a control panel, air is vented into, for example, an air bellows. Then an operator can press the button 2311 to disengage the latch bolt assembly. Due to gravity, the container 2311 will moving downward while controlled by the rotary-to-linear dampener 1740.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A vertically stowable aircraft storage unit for providing additional storage in a cabin area of an aircraft, the stowable aircraft storage unit comprising:
   a storage compartment comprising a bottom panel, two side panels, and a rear panel;
   a vacuum lift mechanism for lifting and lowering the storage unit between a stowed position and a deployed position, the vacuum lift mechanism comprising
      at least one vacuum actuator, and
      an air manifold in fluid communication with a vacuum source, the air manifold configured to provide vacuum and venting to the at least one vacuum actuator; and
   an overhead mounting frame for mounting the vacuum lift mechanism to an upper structure of an interior of the aircraft; and
   a storage compartment frame configured to releasably receive the storage compartment;
   wherein the vacuum lift mechanism is releasably attached, at an upper end, to the overhead mounting frame; and
   wherein the vacuum lift mechanism is releasably attached, at a lower end, to the storage compartment frame.

2. The vertically stowable aircraft storage unit of claim 1, wherein the stowable aircraft storage unit is configured as part of an aircraft galley monument.

3. The vertically stowable aircraft storage unit of claim 2, wherein the storage compartment is configured to receive and retain a plurality of aircraft galley standard unit containers.

4. The vertically stowable aircraft storage unit of claim 1, wherein the vacuum source is configured to provide vacuum for both the vertically stowable aircraft storage unit and a waste water unit of a galley monument.

5. The vertically stowable aircraft storage unit of claim 1, further comprising a manual override mechanism for lifting and lowering the storage unit in the event of failure of the vacuum lift mechanism, the manual override mechanism comprising:
   a rotary-to-linear drive mechanism;
   a manual control mechanism for operating the rotary-to-linear drive mechanism; and
   a manual override mounting frame for releasably mounting the manual override mechanism between the overhead mounting frame and the storage compartment frame.

6. The vertically stowable aircraft storage unit of claim 5, wherein the rotary-to-linear drive mechanism comprises a lead screw.

7. The vertically stowable aircraft storage unit of claim 5, wherein the manual control mechanism comprises a hand crank.

8. The vertically stowable aircraft storage unit of claim 5, wherein the manual control mechanism is pivotably mounted to a lower horizontal structural member of the manual override mounting frame.

9. The vertically stowable aircraft storage unit of claim 1, further comprising a rotary-to-linear damping mechanism for controlling speed of lifting and lowering of the storage unit, the rotary-to-linear damping mechanism comprising:
   a set of rotary drums;
   at least one rotary damper connected to at least one drum of the set of rotary drums; and
   a set of cables;
   wherein
      a first drum of the set of rotary drums is configured to release a first cable of the set of cables while a second drum of the set of rotary drums is configured to coil the a second cable of the set of cables during lowering of the storage compartment frame, wherein the first cable is connected proximate a top of the overhead mounting frame, and the second cable is connected proximate a bottom of the overhead mounting frame.

10. The vertically stowable aircraft storage unit of claim 9, wherein the rotary-to-linear damping mechanism comprises a set of pulleys s to translate a rotary operation of the rotary damper and the set of rotary drums to a linear operation of the set of cables.

11. The vertically stowable aircraft storage unit of claim 1, further comprising a latching mechanism for releasably latching the storage compartment frame and storage compartment in the stowed position.

12. The vertically stowable aircraft storage unit of claim 11, wherein the latching mechanism comprises a set of at least four electronic latches, each electronic latch of the at least four electronic latches positioned proximate a respective corner of the overhead mounting frame.

13. The vertically stowable aircraft storage unit of claim 11, wherein the latching mechanism comprises at least two spring-enabled bolt assemblies.

14. The vertically stowable aircraft storage unit of claim 11, further comprising a manual release mechanism for disengaging the latching mechanism.

15. The vertically stowable aircraft storage unit of claim 14, wherein the manual release mechanism is built into a handle mounted on the bottom panel of the storage compartment.

16. The vertically stowable aircraft storage unit of claim 1, further comprising an impact avoidance mechanism, the impact avoidance mechanism comprising:
   at least one sensor; and
   a trigger mechanism configured to, upon identifying an obstruction, trigger the vacuum lift mechanism to reverse course from lowering to lifting to avoid impact with the identified obstruction.

17. The vertically stowable aircraft storage unit of claim 1, further comprising a control panel unit for controlling the vacuum lift mechanism via at least one user-actuated control.

18. The vertically stowable aircraft storage unit of claim 1, wherein the upper structure of the interior of the aircraft is above a ceiling of the cabin area.

19. The vertically stowable aircraft storage unit of claim 1, further comprising a second storage compartment frame configured to releasably receive a second storage compartment.

20. The vertically stowable aircraft storage unit of claim 1, wherein the storage compartment comprises a garment rack.

* * * * *